(12) United States Patent
Stein

(10) Patent No.: US 12,252,879 B2
(45) Date of Patent: *Mar. 18, 2025

(54) MULTIFUNCTIONAL SYSTEM FOR PASSIVE HEAT AND WATER MANAGEMENT

(71) Applicant: Techstyle Materials, Inc., Somerville, MA (US)

(72) Inventor: Derek Martin Stein, Providence, RI (US)

(73) Assignee: Adept Materials, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,372

(22) Filed: Nov. 8, 2023

(65) Prior Publication Data

US 2024/0301679 A1 Sep. 12, 2024

Related U.S. Application Data

(63) Continuation of application No. 17/891,771, filed on Aug. 19, 2022, now Pat. No. 11,851,871, which is a (Continued)

(51) Int. Cl.
*E04B 1/64* (2006.01)
*B32B 7/12* (2006.01)
(Continued)

(52) U.S. Cl.
CPC ............... *E04B 1/64* (2013.01); *B32B 7/12* (2013.01); *B32B 19/02* (2013.01); *B32B 19/045* (2013.01);
(Continued)

(58) Field of Classification Search
None
See application file for complete search history.

(56) References Cited

U.S. PATENT DOCUMENTS

| 1,808,829 A | 6/1931 | Barnes |
| 2,941,759 A | 6/1960 | Rice et al. |
| (Continued) | | |

FOREIGN PATENT DOCUMENTS

| CN | 1658949 A | 8/2005 |
| CN | 107249715 B | 11/2020 |
| (Continued) | | |

OTHER PUBLICATIONS (Mar. 2017) Smart Vapor Barrier (Variable Air Permeability Airtight Sheet) Dupont Tyvek Smart, Asahi-DuPont FlashSpan Products Co. Ltd., also available at: <https://www.tyvek.co.jp/construction/common/pdf/catalog/catalog_TyvekSmart_170329.pdf>, 4 pages.
(Continued)

*Primary Examiner* — Joshua K Ihezie
(74) *Attorney, Agent, or Firm* — Mintz Levin Cohn Ferris Glovsky and Popeo, P.C.

(57) ABSTRACT

In an embodiment, a multifunctional material system is provided and can include a variable-permeability layer, a desiccant containing layer, and a vapor-permeable supporting layer. The variable-permeability layer can have a vapor permeability that increases with increasing relative humidity. The desiccant containing layer can be adjacent the variable-permeability layer. The vapor-permeable supporting layer can be positioned adjacent at least one of the variable-permeability layer and the desiccant containing layer. Water moves in a first direction from the variable-permeability layer to the desiccant layer when relative humidity is greater adjacent the variable-permeability layer than the desiccant layer. Water moves a second, opposing direction, from the desiccant containing layer to the variable-permeability layer when the relative humidity is greater adjacent the desiccant containing layer than the variable-permeability layer. The rate of water motion in the first
(Continued)

direction is greater than the second direction when the humidity gradient is reversed.

10 Claims, 16 Drawing Sheets

Related U.S. Application Data continuation of application No. 16/558,091, filed on Aug. 31, 2019, now Pat. No. 11,560,710.

(60) Provisional application No. 62/725,446, filed on Aug. 31, 2018.

(51) Int. Cl.
    *B32B 19/02*    (2006.01)
    *B32B 19/04*    (2006.01)
    *B32B 27/14*    (2006.01)
    *B32B 27/18*    (2006.01)
    *B32B 27/34*    (2006.01)

(52) U.S. Cl.
CPC .............. *B32B 27/14* (2013.01); *B32B 27/18* (2013.01); *B32B 27/34* (2013.01); *B32B 2264/10* (2013.01); *B32B 2307/724* (2013.01); *B32B 2607/00* (2013.01)

(56) References Cited

U.S. PATENT DOCUMENTS

| | | | |
|---|---|---|---|
| 3,090,212 A | 5/1963 | Anderson et al. | |
| 3,138,009 A | 6/1964 | Mccreight | |
| 3,231,644 A | 1/1966 | Ming-Yang | |
| 3,299,795 A | 1/1967 | Araujo | |
| 3,410,336 A | 11/1968 | Paul | |
| 3,445,322 A * | 5/1969 | Saiia | E02D 31/02 428/443 |
| 3,490,718 A | 1/1970 | Vary | |
| 3,732,138 A * | 5/1973 | Almog | E04C 2/205 428/416 |
| 3,893,506 A | 7/1975 | Laing | |
| 3,905,203 A | 9/1975 | Jacob | |
| 3,984,995 A | 10/1976 | Starr et al. | |
| 4,000,850 A | 1/1977 | Diggs | |
| 4,184,338 A | 1/1980 | Bennett | |
| 4,301,631 A | 11/1981 | Tazaki | |
| 4,309,365 A | 1/1982 | Van et al. | |
| 4,482,111 A * | 11/1984 | Le Touche | B64G 1/58 428/921 |
| 4,516,631 A | 5/1985 | Russell | |
| 4,556,049 A | 12/1985 | Tchernev | |
| 4,935,169 A | 6/1990 | Ernst | |
| 5,070,933 A | 12/1991 | Baer | |
| 5,296,287 A | 3/1994 | Ribbans | |
| 5,329,785 A | 7/1994 | Sakurai et al. | |
| 5,357,726 A | 10/1994 | Effenberger et al. | |
| 5,820,956 A * | 10/1998 | Hatakeyama | B32B 27/34 428/476.3 |
| 5,858,501 A * | 1/1999 | Malone | B32B 5/18 428/35.8 |
| 5,884,486 A | 3/1999 | Hughes et al. | |
| 5,987,833 A * | 11/1999 | Heffelfinger | E04B 1/78 52/407.3 |
| 6,349,760 B1 | 2/2002 | Budelman | |
| 6,367,275 B1 | 4/2002 | Stephan | |
| 6,627,444 B1 | 9/2003 | Goledzinowski et al. | |
| 6,820,439 B1 | 11/2004 | Marek | |
| 6,948,556 B1 | 9/2005 | Anderson et al. | |
| 6,990,816 B1 | 1/2006 | Zuo et al. | |
| 7,464,504 B2 | 12/2008 | Hartzell et al. | |
| 7,824,766 B2 * | 11/2010 | Eplee | B01D 53/28 428/323 |
| 8,209,992 B2 | 7/2012 | Alden | |
| 8,966,845 B1 * | 3/2015 | Ciuperca | B32B 5/18 52/309.12 |
| 8,986,569 B2 * | 3/2015 | Kullberg | F16L 59/08 252/181.1 |
| 9,562,359 B1 * | 2/2017 | Grisolia | B32B 3/266 |
| 11,560,710 B2 | 1/2023 | Stein | |
| 2002/0011075 A1 | 1/2002 | Faqih | |
| 2002/0166327 A1 | 11/2002 | Brandt et al. | |
| 2003/0056943 A1 | 3/2003 | Dessiatoun et al. | |
| 2003/0175488 A1 * | 9/2003 | Asthana | B29C 45/14811 428/212 |
| 2003/0194584 A1 * | 10/2003 | Clausen | E04C 2/043 52/517 |
| 2004/0115419 A1 | 6/2004 | Qin et al. | |
| 2005/0000183 A1 * | 1/2005 | Fay | E04B 1/7654 52/506.01 |
| 2005/0045030 A1 | 3/2005 | Tonkovich et al. | |
| 2005/0249901 A1 * | 11/2005 | Yializis | B32B 27/06 428/35.7 |
| 2006/0032171 A1 | 2/2006 | Weir et al. | |
| 2006/0123723 A1 | 6/2006 | Weir et al. | |
| 2006/0191278 A1 | 8/2006 | Cooke | |
| 2006/0211321 A1 * | 9/2006 | Lubker | E04F 13/0864 52/302.1 |
| 2008/0028704 A1 | 2/2008 | Cooper et al. | |
| 2008/0086981 A1 | 4/2008 | Kilkis et al. | |
| 2009/0042471 A1 * | 2/2009 | Cashin | B32B 27/32 442/182 |
| 2009/0056917 A1 | 3/2009 | Majumdar et al. | |
| 2009/0126371 A1 | 5/2009 | Powell et al. | |
| 2009/0215610 A1 * | 8/2009 | Kullberg | C01B 3/0084 502/56 |
| 2010/0115977 A1 | 5/2010 | Saroka | |
| 2010/0147763 A1 | 6/2010 | Tsou et al. | |
| 2010/0200199 A1 | 8/2010 | Habib et al. | |
| 2010/0203790 A1 | 8/2010 | Moulton et al. | |
| 2010/0209679 A1 * | 8/2010 | Tompkins | B64C 1/40 428/220 |
| 2010/0294467 A1 | 11/2010 | Varanasi et al. | |
| 2012/0003451 A1 * | 1/2012 | Weigel | B32B 27/322 428/212 |
| 2012/0009834 A1 | 1/2012 | Augustyniak et al. | |
| 2012/0077015 A1 | 3/2012 | Zhou et al. | |
| 2013/0189511 A1 * | 7/2013 | Cernohous | B32B 5/18 428/317.1 |
| 2013/0196136 A1 * | 8/2013 | Contzen | B32B 27/12 428/221 |
| 2014/0020413 A1 | 1/2014 | Sauerbeck et al. | |
| 2014/0259964 A1 | 9/2014 | Rickie | |
| 2014/0260369 A1 | 9/2014 | Lepoudre | |
| 2014/0272404 A1 * | 9/2014 | Shake | B32B 17/06 428/221 |
| 2014/0319706 A1 * | 10/2014 | Huizing | B01D 53/22 264/131 |
| 2015/0071978 A1 | 3/2015 | Chang | |
| 2015/0241118 A1 * | 8/2015 | Wu | F25D 23/065 156/276 |
| 2015/0354205 A1 * | 12/2015 | Sieber | E04B 1/665 52/309.1 |
| 2016/0010876 A1 | 1/2016 | Reuter et al. | |
| 2016/0069067 A1 * | 3/2016 | Ciuperca | E04B 1/7633 52/309.8 |
| 2016/0340064 A1 | 11/2016 | Loda | |
| 2016/0374411 A1 | 12/2016 | Brooks et al. | |
| 2018/0015688 A1 * | 1/2018 | Park | B32B 5/30 |
| 2018/0147820 A1 * | 5/2018 | Leyder | B32B 27/32 |
| 2018/0311929 A1 * | 11/2018 | Mason | B32B 5/16 |
| 2018/0320368 A1 * | 11/2018 | Gonzales | B32B 5/028 |
| 2019/0003176 A1 * | 1/2019 | Donelan | E04C 2/528 |
| 2019/0091976 A1 * | 3/2019 | Roehrig | B32B 27/30 |
| 2019/0264440 A1 * | 8/2019 | Grant | B32B 27/065 |
| 2019/0382622 A1 * | 12/2019 | Seabaugh | C09J 5/00 |
| 2020/0023792 A1 * | 1/2020 | Wei | B32B 27/16 |
| 2020/0071926 A1 | 3/2020 | Stein | |
| 2020/0139674 A1 * | 5/2020 | Donelan | B32B 27/12 |

(56) References Cited

U.S. PATENT DOCUMENTS

2021/0122147 A1* 4/2021 Kawanishi .............. B32B 27/28
2022/0389705 A1   12/2022 Stein

FOREIGN PATENT DOCUMENTS

| EP | 2759403 B1 | 4/2016 |
|---|---|---|
| EP | 3183051 A1 | 6/2017 |
| JP | H04343797 A | 11/1992 |
| JP | 2015510949 A | 4/2015 |
| JP | 2018001540 A | 1/2018 |
| WO | 2014122152 A1 | 8/2014 |
| WO | 2019114932 A1 | 6/2019 |
| WO | 2020047525 A1 | 3/2020 |

OTHER PUBLICATIONS

Karamanis et al. (Dec. 2013) "Cooling roofs through low temperature solar-heat transformations in hydrophilic porous materials", Advances in Building Energy Research, 7(2):235-243.
Nachman, Farchi Y. (2009) "Learning from nature—Thermoregulation Envelopes. A dissertation.", TU Delft, Delft University of Technology, 98 pages.
(Nov. 22, 2017) "Tyvek Airguard Smart", Retrieved from: https://www.isorex.com/wp-content/uploads/tyvek-AirGuard-Smart-NL.pdf, 4 Pages.

\* cited by examiner

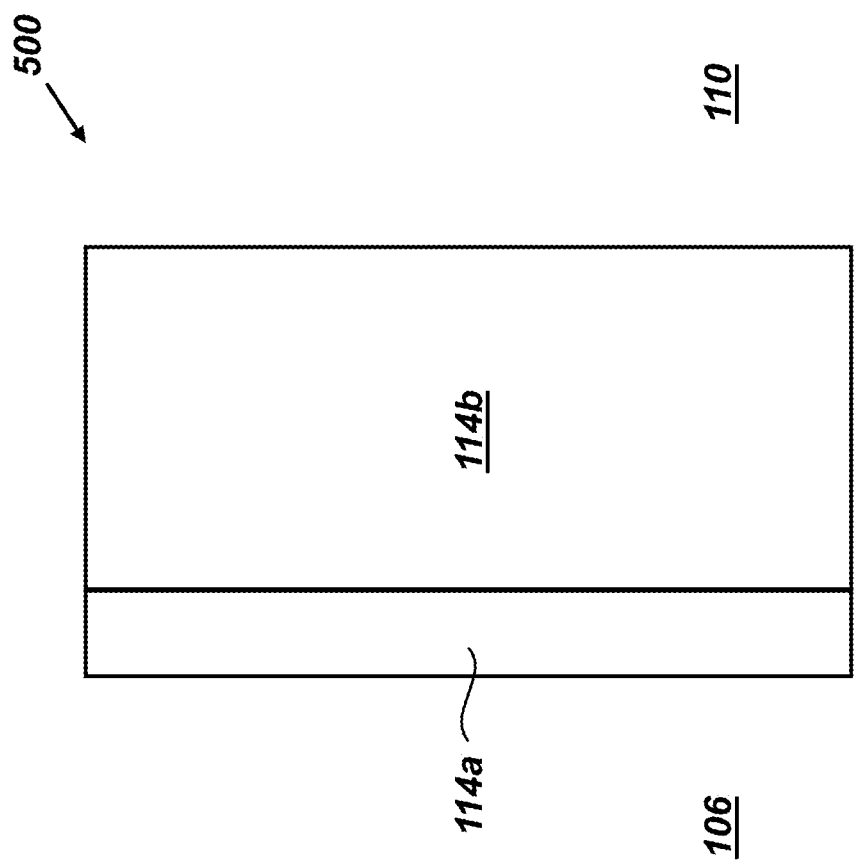

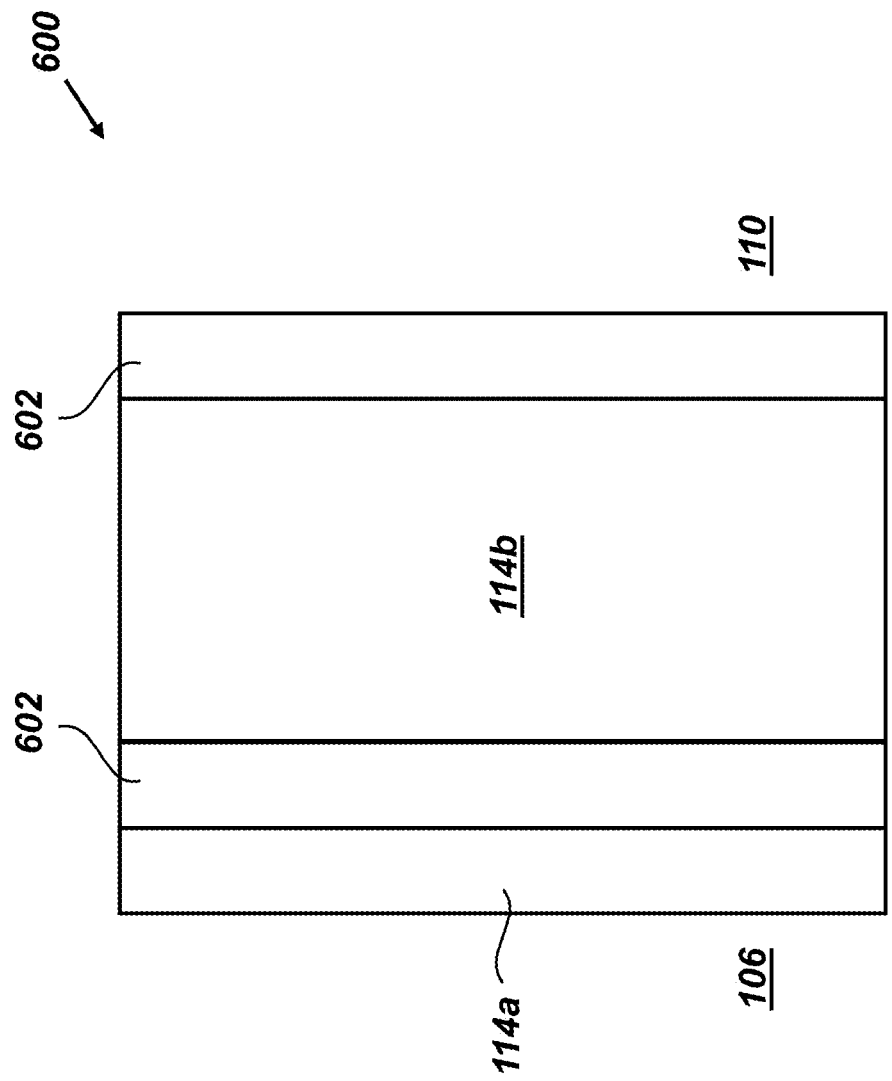

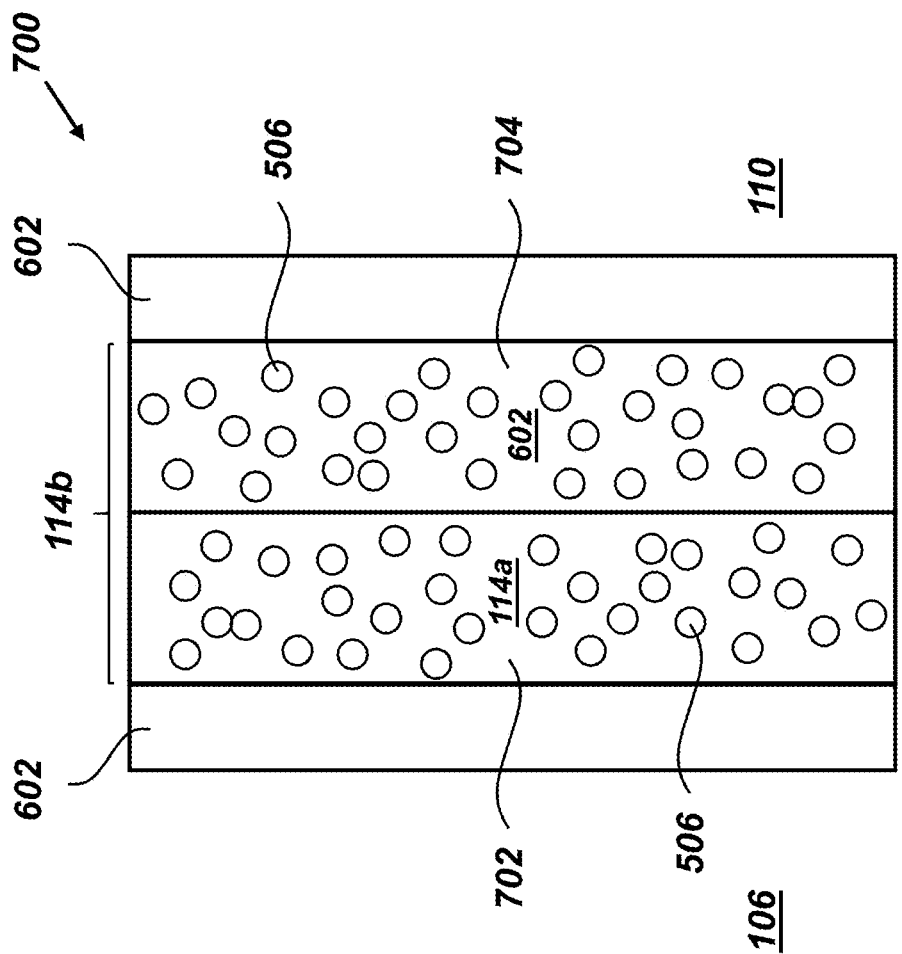

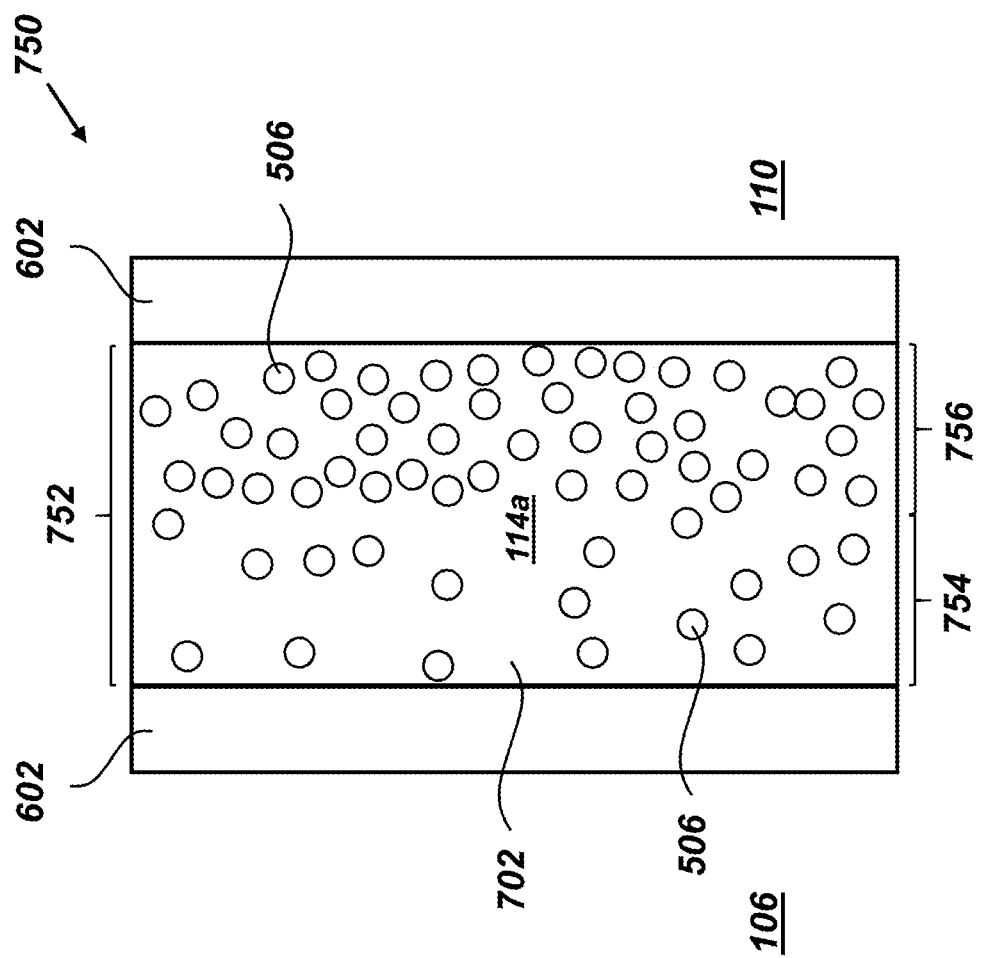

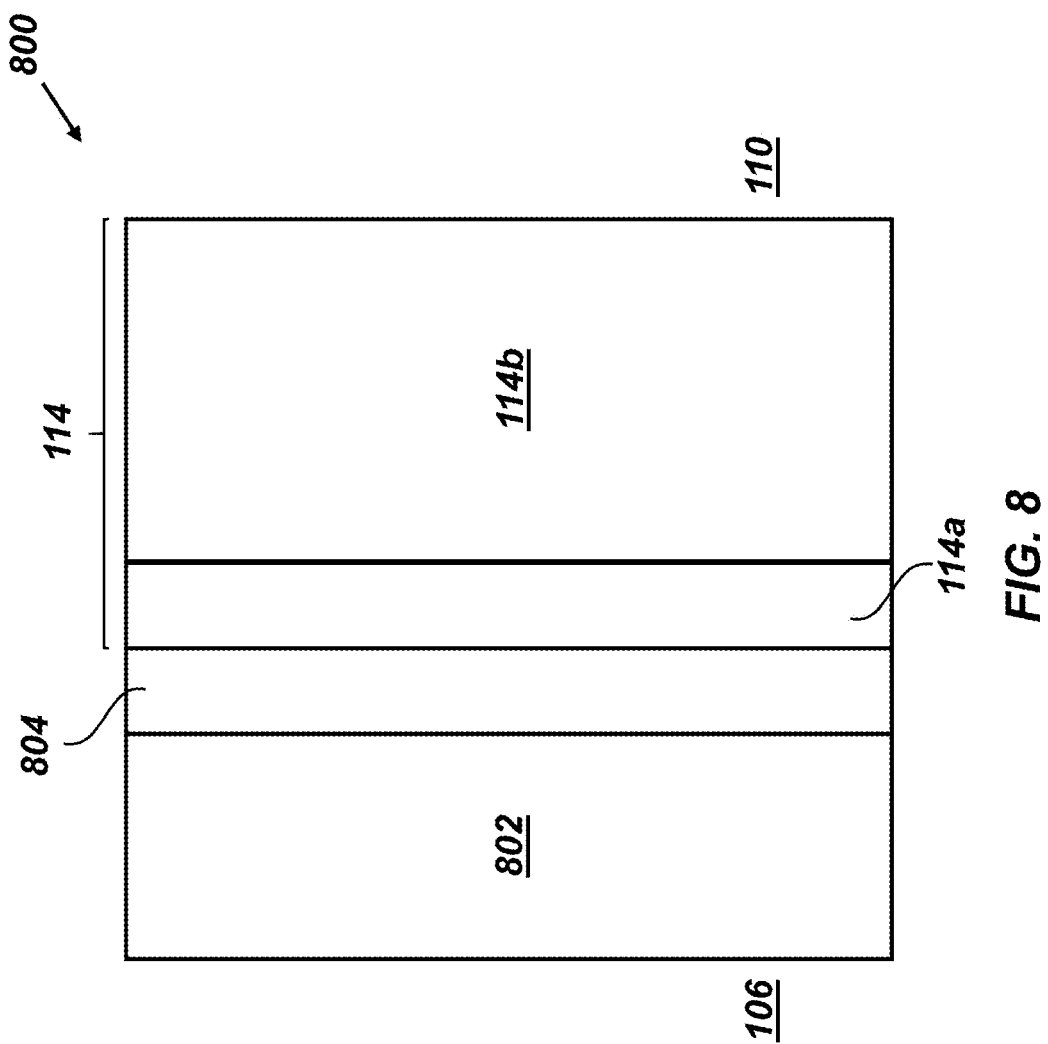

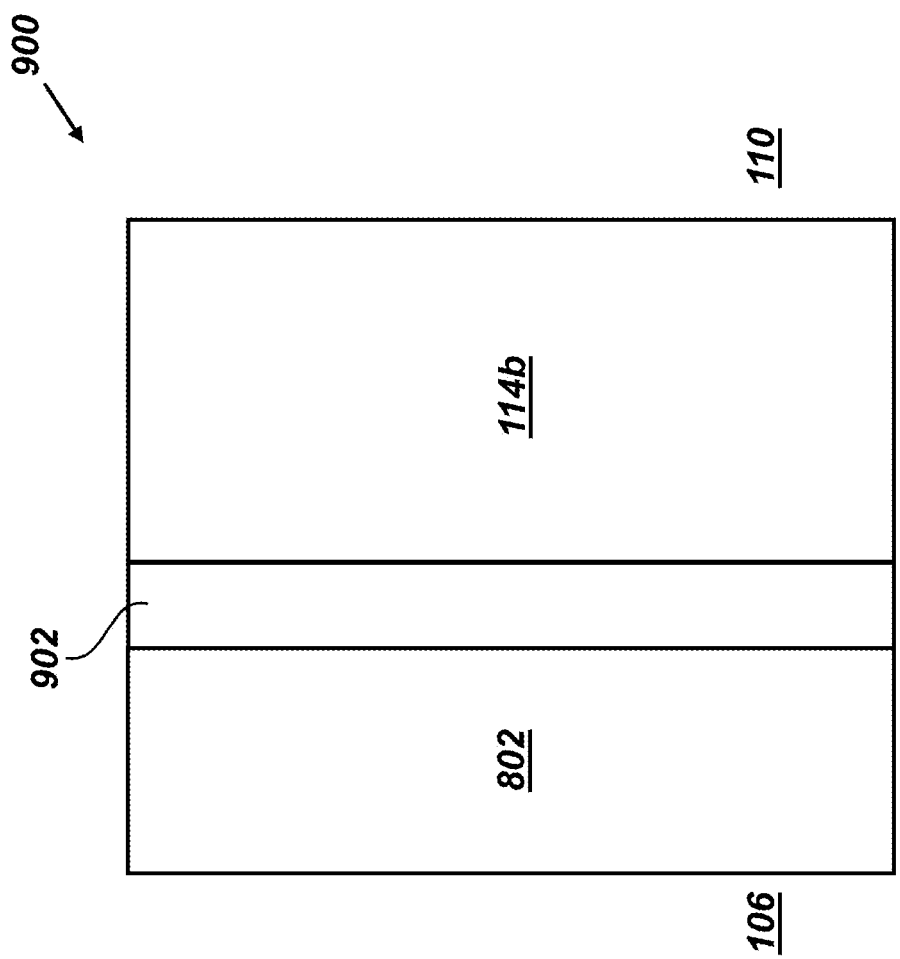

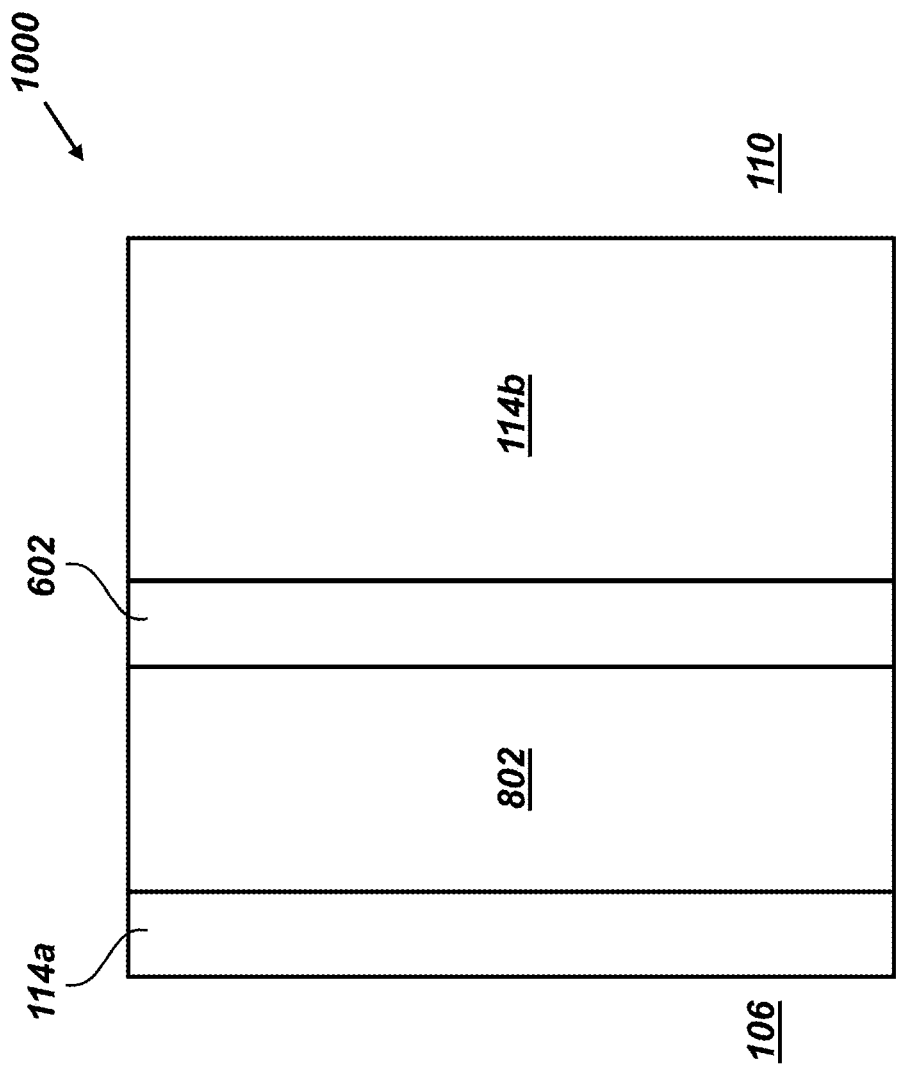

MULTIFUNCTIONAL SYSTEM FOR PASSIVE HEAT AND WATER MANAGEMENT

CROSS-REFERENCE TO RELATED APPLICATIONS

This application is a continuation of U.S. patent application Ser. No. 17/891,771, filed on Aug. 19, 2022, now U.S. patent Ser. No. 11/851,871, issued on Dec. 26, 2023, which is a continuation of U.S. patent application Ser. No. 16/558,091, filed on Aug. 31, 2019, now U.S. Pat. No. 11,560,710, issued on Jan. 24, 2023, which claims the benefit of U.S. Provisional Patent Application No. 62/725,446, filed Aug. 31, 2018 and entitled "Construction Materials Incorporating A Multifunctional Subsystem For Passive Heat And Water Management In Building Envelopes," the entirety of which each are incorporated by reference.

BACKGROUND

It is desirable for enclosures, such as buildings, to possess characteristics such as energy efficiency, comfort, and durability, at affordable cost. However, attempts to achieve these characteristics concurrently can come into conflict. As an example, the energy efficiency of buildings can be improved by the use of insulation and increasing the airtightness of the building. However, moisture control is a growing concern. Notably, achieving high R-values (a measure of resistance to heat conduction) by insulation and airtightness of an enclosure can result in reduced permeability to water vapor and increased risk of condensation, moisture damage, and mold. Thus, as energy efficiency improves, durability and comfort can often decline.

SUMMARY

A variety of technologies have been developed to provide improved moisture control. In one aspect, "smart" vapor retarder membranes exhibit a permeability to water vapor that changes with relative humidity. As an example, the permeability of the membranes increases sharply with increasing relative humidity, which allows a wall to dry when water infiltrates, while the permeability of the membranes decrease with decreasing relative humidity, retarding the diffusion of water vapor into the wall. However, even a smart vapor retarder allows a finite amount of water into a wall when the relative humidity rises outside because diffusion causes water vapor to move in the direction of decreasing humidity. Once the relative humidity falls, the amount of time required to remove the water vapor from the wall is approximately equal to the amount of time during which water vapor was added to the wall. That is, when the magnitude of a relative humidity gradient across a wall is reversed, smart vapor retarders exhibit a time symmetry with respect to ingress and egress of water vapor. Thus, it can be understood that smart vapor retarders lack a mechanism to preferentially inhibit water vapor ingress as compared to water vapor egress when relative humidity conditions are reversed.

Desiccant-based systems are another state-of-the-art moisture control technology. Desiccant systems remove water directly from the air by adsorbing the water to the surfaces of the desiccant material. When the desiccant material is heated, the adsorbed water is driven away from the surface of the desiccant. This process restores the capacity of the desiccant to dehumidify air. In contrast, existing HVAC systems remove water from air by first cooling the air below the dew point, then heating it up again to the desired temperature. As HVAC systems require power for both cooling and heating of air during operation, they are significantly less energy efficient than existing HVAC systems with respect to moisture control. However, while desiccant-based dehumidification systems have improved energy efficiency as compared to existing HVAC systems, they still consume energy to produce the heat needed to regenerate the desiccants It can be appreciated that improvements in energy-efficiency of a building often add significantly to the cost of construction. In general, the installation of additional layers for air, moisture, and thermal control significantly increases labor costs. Therefore, multifunctional building materials capable of concurrently regulating the ingress and egress of water vapor, storing and releasing heat, and performing humidification and dehumidification can improve a building's thermal and hygric performance, providing improved energy efficiency, while also reducing the labor costs of construction. Furthermore, multifunctional materials capable of both humidifying and dehumidifying air, without moving mechanical parts or power, could provide further efficiency improvements.

Embodiments of the present disclosure provide a multifunctional material system that address these issue. A first function of the multifunctional material system is the storage and release of heat energy in a manner similar to that of phase-change materials (PCMs). In general, PCMs can regulate temperature by absorbing or releasing latent heat as the surrounding temperature rises or falls, respectively, past the phase transition temperature. Existing PCMs can undergo phase changes between the liquid state and the solid state, as in the case of paraffins, and between the hydrated state and the anhydrous state, as in the case of salt hydrates. The multifunctional material system can adsorb or release heat as water passes between the gas state and the condensed state on a material surface (e.g., the vaporization/condensation line of the water phase diagram). This PCM-like behavior can provide improved energy efficiency by reducing the energy demand on an HVAC system by an amount equal to the latent heat transferred.

A second function of the multifunctional material system is the storage and release of water vapor in the manner of a humidity buffer. Humidity buffering, also referred to as moisture buffering, characterizes the ability of materials to moderate changes in relative humidity by absorption and desorption of water vapor from the surrounding air. Humidity is an important determinant of human comfort, with most people preferring an environment with a relative humidity in the range of about 35%-60%. Excessively high humidity levels also create conditions under which mold, mildew, and dust mites may grow. Excessively low humidity levels may also cause dry eyes and skin, increase the risk of respiratory problems, or increase the risk of contracting a cold or flu.

A third function of the multifunctional material system is to bias diffusive flow of water vapor in the direction of a desiccant layer in the manner of a water vapor diode, also referred to as one-way water vapor valve. That is, diffusive flow of water vapor is permitted in an "open" direction of the water vapor diode and inhibited in a "closed" direction of the water vapor diode. This functionality of the multifunctional material system inhibits ingress of water vapor from an environment external to the enclosure while facilitating egress of water vapor from an environment internal to the enclosure.

When employed in a building envelope, embodiments of the disclosed multifunctional materials can provide reduced installation costs, relative to the installation of a separate membrane layer in the building envelope. Furthermore, in alternative embodiments, the disclosed multifunctional materials can omit either the variable-permeability layer or the desiccant layer. Such modified multifunctional material can confer a subset of the performance benefits, optimal in different areas of a building, like bathrooms and kitchens, where humidity control or water vapor transport is the main concern.

In an embodiment, a multifunctional material system is provided and can include a variable-permeability layer, a desiccant containing layer, and a vapor-permeable supporting layer. The variable-permeability layer can have a vapor permeability that increases with increasing relative humidity. The desiccant containing layer can be adjacent the variable-permeability layer. The vapor-permeable supporting layer can be positioned adjacent at least one of the variable-permeability layer and the desiccant containing layer. Water moves in a first direction from the variable-permeability layer to the desiccant layer when relative humidity is greater adjacent the variable-permeability layer than the desiccant layer. Water moves a second, opposing direction, from the desiccant containing layer to the variable-permeability layer when the relative humidity is greater adjacent the desiccant containing layer than the variable-permeability layer. The rate of water motion in the first direction is greater than the second direction when the humidity gradient is reversed.

In another embodiment, the vapor-permeable layer is interposed between the desiccant containing layer and the variable-permeability layer.

In another embodiment, the permeability of the variable-permeability layer increases approximately exponentially with increasing relative humidity.

In another embodiment, the desiccant containing layer is substantially homogeneous.

In another embodiment, the desiccant containing layer is a composite including desiccant particles embedded in a matrix.

In another embodiment, the desiccant containing layer includes a first layer having a matrix formed from a vapor-permeable binder and a second layer having a matrix formed from a variable-permeable binder, wherein the first layer is the variable-permeability layer.

In another embodiment, at least a portion of the desiccant containing layer is formed from desiccant material. The desiccant material can be at least one of a silica gel, zeolites, calcium oxide ($CaO_2$), calcium sulfate ($CaSO_4$), lithium chloride (LiCl), a clay, or activated charcoal.

In another embodiment, the vapor-permeable layer is formed from polylactic acid (PLA), polytetrafluoroethylene, a silicone, a natural rubber, a synthetic rubber, a polystyrene, polymethylpentene (PMP), a polycarbonate (PC), a polyurethane (PU), or polymethylmethacrylate (PMMA).

In another embodiment, the variable-permeability layer is formed from a polyamide or polyvinyl alcohol (PVA). As an example, the polyamide can be nylon.

In an embodiment, a wall assembly is provided and can include a wall cavity, a thermally insulating material, and a multifunctional material system. The wall cavity can define a first surface adjacent a building interior and second surface adjacent a building exterior. The thermally insulating material can be positioned within at least a portion of the wall cavity. The multifunctional material system can include a variable-permeability layer, a desiccant containing layer, and a vapor-permeable supporting layer. The variable-permeability layer can have a vapor permeability that increases with increasing relative humidity. The desiccant containing layer can be adjacent the variable-permeability layer. The vapor-permeable supporting layer can be positioned adjacent at least one of the variable-permeability layer and the desiccant containing layer. Water moves in a first direction from the variable-permeability layer to the desiccant layer when relative humidity is greater adjacent the variable-permeability layer than the desiccant layer. Water moves a second, opposing direction, from the desiccant containing layer to the variable-permeability layer when the relative humidity is greater adjacent the desiccant containing layer than the variable-permeability layer. The rate of water motion in the first direction is greater than the second direction when the humidity gradient is reversed. The multifunctional material system can be positioned on at least one of the first and second surfaces of the wall cavity.

In an embodiment, a multifunctional material assembly is provided and can include a substrate; and a multifunctional material system. The multifunctional material system can include a variable-permeability layer, a desiccant containing layer, and a vapor-permeable supporting layer. The variable-permeability layer can have a vapor permeability that increases with increasing relative humidity. The desiccant containing layer can be adjacent the variable-permeability layer. The vapor-permeable supporting layer can be positioned adjacent at least one of the variable-permeability layer and the desiccant containing layer. Water moves in a first direction from the variable-permeability layer to the desiccant layer when relative humidity is greater adjacent the variable-permeability layer than the desiccant layer. Water moves a second, opposing direction, from the desiccant containing layer to the variable-permeability layer when the relative humidity is greater adjacent the desiccant containing layer than the variable-permeability layer. The rate of water motion in the first direction is greater than the second direction when the humidity gradient is reversed. The multifunctional material system can be positioned on at least one of the first and second surfaces of the wall cavity. At least one layer of the multifunctional material system can be positioned on a surface of the substrate.

In another embodiment, the assembly can further include an adhesive layer interposed between the substrate and a layer of the multifunctional material system.

In another embodiment, the adhesive layer is the variable-permeability layer.

In another embodiment, the substrate is oriented strand board (OSB), insulation, gypsum board, cement board, stucco, drywall, sheathing, roofing, cladding, or an architectural membrane.

In another embodiment, the variable-permeability layer is positioned on a first surface of the substrate and the desiccant containing layer is positioned on a second surface of the substrate, opposite the first surface of the substrate.

In another embodiment, the multifunctional material assembly includes the desiccant containing layer formed from a matrix of the substrate and desiccant particles embedded in the substrate, where the variable-permeability layer is deposited on a surface of the desiccant layer.

In an embodiment, a multifunctional material assembly is provided and includes a pocketed structure, a plurality of desiccant particles, and a variable-permeability layer. The pocketed structure can define one or more pockets having an open side. The plurality of desiccant particles can be positioned within respective ones of the one or more pockets (e.g., occupying at least a portion of the volume of each pocket). The variable-permeability layer can have a vapor permeability that increases with increasing relative humidity. The variable permeability layer can also overlie respective open sides of the one or more pockets.

The multifunctional material assembly can also include a substrate. The variable-permeability layer can be secured to the substrate.

DESCRIPTION OF DRAWINGS

These and other features will be more readily understood from the following detailed description taken in conjunction with the accompanying drawings, in which:

FIG. 5a is a diagram illustrating one exemplary embodiment of a multifunctional material system including a variable-permeability layer and a desiccant layer;

FIG. 6 is a diagram illustrating one exemplary embodiment of a multifunctional material system including one or more vapor-permeable supporting layers;

FIG. 7a is a diagram illustrating one exemplary embodiment of a multifunctional material system including a desiccant layer having two layers;

FIG. 7b is a diagram illustrating one exemplary embodiment of a multifunctional material system in the form of a composite having a gradient in a concentration of desiccant through its thickness;

FIG. 8 is a diagram illustrating one exemplary embodiment of a multifunctional material adhered to a substrate;

FIG. 9 is a diagram illustrating another exemplary embodiment of a multifunctional material adhered to a substrate;

FIG. 10 is a diagram illustrating another exemplary embodiment of a multifunctional material adhered to a substrate, where vapor retarder and desiccant layers are positioned on opposing sides of the substrate;

It is noted that the drawings are not necessarily to scale. The drawings are intended to depict only typical aspects of the subject matter disclosed herein, and therefore should not be considered as limiting the scope of the disclosure.

DETAILED DESCRIPTION

Embodiments of multifunctional material systems and corresponding methods of fabrication and use as building materials are discussed herein. However, embodiments of the disclosure can be employed in other applications without limit.

Figure 1:
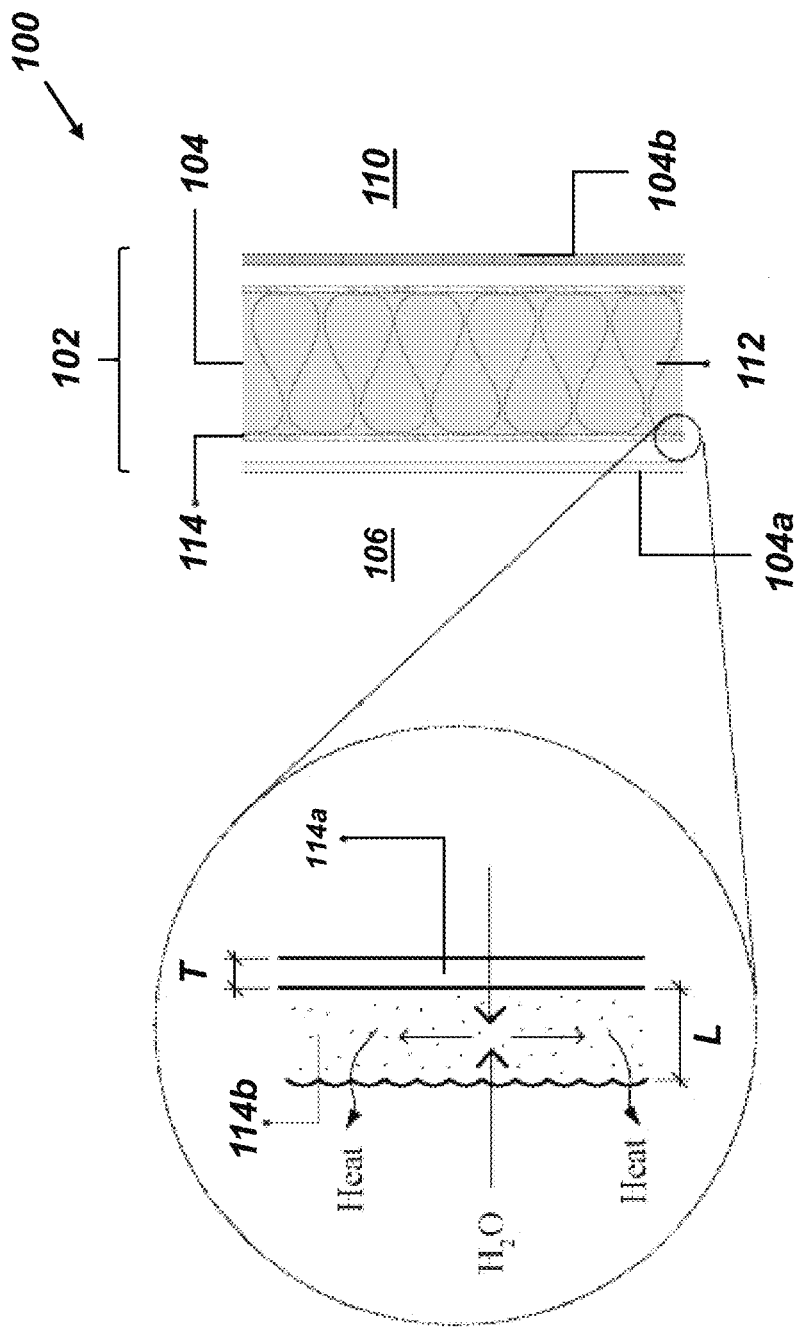
FIG. 1 is a diagram illustrating one exemplary embodiment of an operating environment including a multifunctional material structure having a variable-permeability layer and a desiccant layer.

FIG. 1 illustrates one exemplary embodiment 100 of an operating environment in the form of a wall assembly 102. The wall assembly 102 includes a wall cavity 104 defining a first or interior surface 104a adjacent an interior environment 106 and a second or exterior surface 104b adjacent an exterior environment 110. In general, the interior environment 106 can be an space enclosed by the wall assembly 102 that is to be conditioned, while the exterior environment 110 is a space that is not conditioned. Thus, when the multifunctional material system 114 is placed on the interior surface 104a of the wall assembly 102, the interior environment 106 can be an interior of a building room and the exterior environment can be outside of the building. However, it can be understood that embodiments of the multifunctional material system can also be used in wall assemblies separating two interior rooms, one of which is conditioned and the other is not (e.g., a stairwell or other unconditioned space). In either case, the desiccant layer can be positioned closest to the unconditioned space/environment.

The wall assembly 102 can further include a thermally insulating material 112 positioned within at least a portion of the wall cavity 104 (e.g., between the first and second surfaces 104a, 104b). The wall assembly 102 can further include a multifunctional material system 114. As shown, the multifunctional material is positioned on the interior surface 104a. However, in alternative embodiments, the multifunctional material system can be positioned on or adjacent to an opposing side of the wall cavity (e.g., on adjacent the exterior surface) or on or adjacent to both the interior and exterior surfaces.

The multifunctional material system 114 can include a variable-permeability layer 114a of thickness T and a desiccant containing layer 114b of thickness L. The variable-permeability layer 114a is also referred to interchangeably herein as a vapor retarder or vapor barrier. As discussed in greater detail below, the desiccant containing layer 114b can be composed substantially entirely of a desiccant material or composed of a composite including the desiccant material embedded in a matrix. For simplicity, however, the desiccant containing layer 114b is referred to herein as a desiccant layer. The desiccant layer 114b is positioned adjacent to the variable-permeability layer 114a. As also discussed in greater detail below, the desiccant layer can be in contact with a side of the variable-permeability layer or separated from a side of the variable-permeability layer by one or more layers interposed therebetween.

Examples of materials from which the variable-permeability layer 114a is formed can include polyamides (e.g., nylon), polyvinyl alcohol (PVA), and various polyions. Examples of desiccant materials from which the desiccant layer 114b is formed can include one or more of silica gel, zeolites, calcium oxide ($CaO_2$), calcium sulfate ($CaSO_4$), lithium chloride (LiCl), clays, or activated charcoal. The thickness L of the desiccant layer 114b can be selected from the range of about 0.05 mm to about 20 mm. The thickness T of the variable-permeability layer 114a can be selected from the range of about 0.001 mm to about 0.01 mm.

In embodiments where the desiccant material is a porous structure, the pore size (e.g., diameter) can range from about 0.4 nm to about 100 m. In other embodiments, the pore size can be about 0.04 nm. In further embodiments, the pore size can be about 100 m.

The pore size of the porous desiccant material can also vary with position within the desiccant layer 114b. As an example, the pore size can decrease approaching a selected side of the desiccant layer 114b (e.g., the side of the desiccant layer 114b closest to the exterior environment 110).

The multifunctional material system 114 can be configured to perform a variety of different functions, alone or in any combination. In one aspect, the multifunctional material system 114 serves as a vapor diode by allowing water to move in a first direction from the side of the variable-permeability layer 114a to the side of the desiccant layer 114b at significantly higher rate than when the humidity gradient is reversed and water vapor is driven in the opposite direction. In another aspect, the multifunctional material system 114 regulates temperature in a manner similar to a phase change material, except the phase change in this context is between adsorbed water in the desiccant layer 114b and water vapor. In a further aspect, the multifunctional material system 114 regulates the relative humidity by adsorbing more water vapor when the humidity rises, and releasing it when the humidity falls. These functions improve the energy efficiency, durability, and comfort of buildings. The physical principles of these functions and estimates of the magnitude of their effects are discussed in detail below.

Vapor Diode Functionality

Embodiments of the vapor diode functionality operate as follows. When the humidity is high on the side of the variable-permeability layer 114a, the permeability to water vapor, also referred to as permeance, rises. The desiccant layer 114b possesses relatively high permeability and adsorbs water received from the variable-permeability layer 114a relatively easily. Subsequently, water received by the side of the desiccant layer 114b evaporates into the air adjacent to the desiccant layer 114b. Conversely, when the humidity is high on the side of the desiccant layer 114b, the desiccant layer 114b absorbs and sequesters water before it reaches the variable-permeability layer 114a. In this manner, the relative humidity present at the variable-permeability layer 114a and therefore the permeability of the variable-permeability layer 114a, remains low. Over a humidity variation cycle, there is a net transfer (e.g., pumping) of water across the multifunctional material system 114. This rectification capability, which does not currently exist in building materials, can be used to pump water out of the wall cavity 104, thereby increasing its durability.

Figure 2:
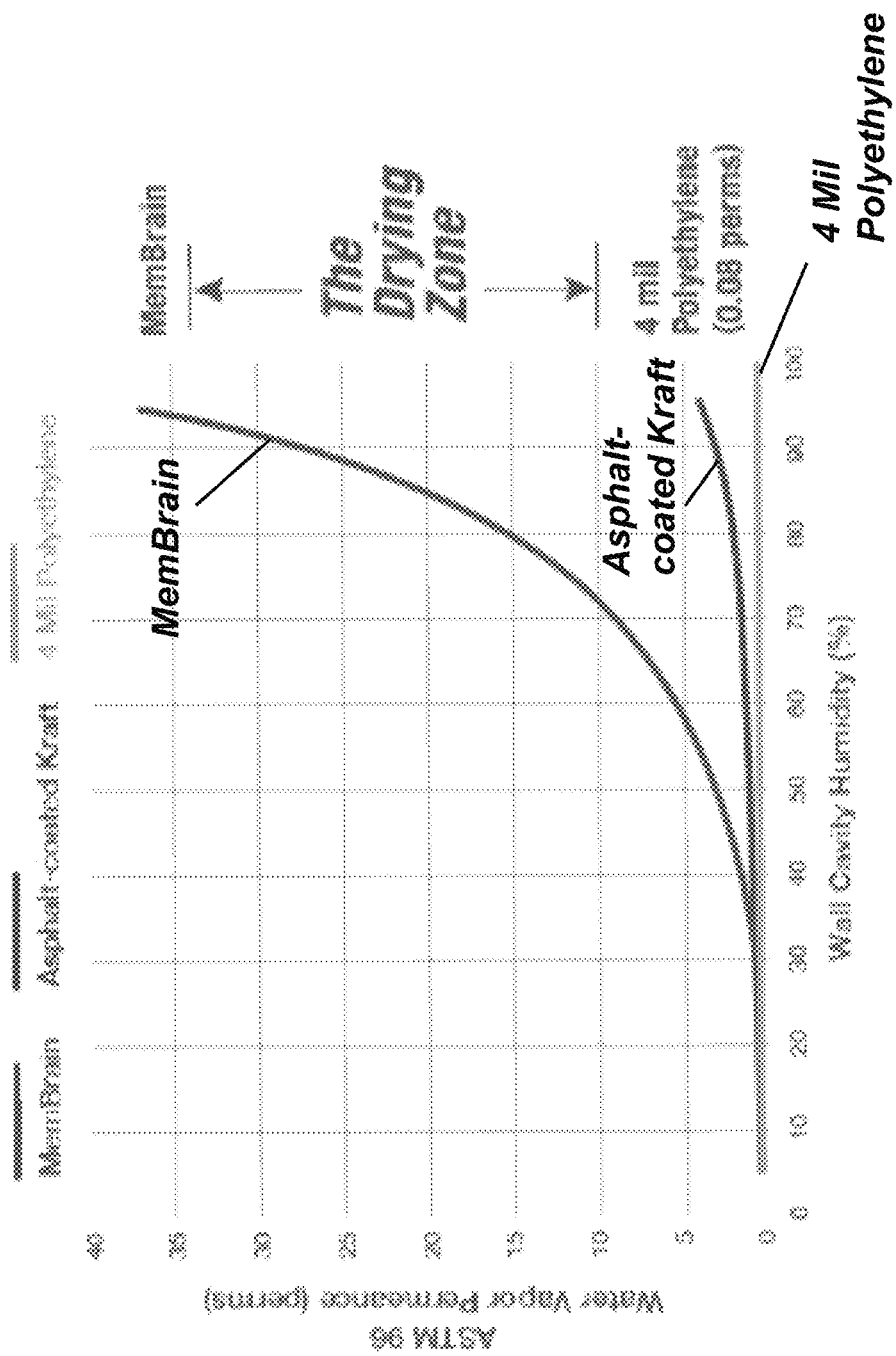
FIG. 2 is a diagram illustrating a plot of water vapor permanence as a function of wall cavity humidity of selected vapor retarders.

The vapor diode functionality relies on both nonlinear and asymmetrical vapor transport characteristics of the multifunctional material system 114. The nonlinearity is provided by the variable-permeability layer 114a, whose permeability rises exponentially with relative humidity RH. FIG. 2 shows the RH-dependent permeance of a smart vapor retarder formed from a polyamide material (MemBrain, Certainteed). It can be observed that the permeance varies by more than two orders of magnitude.

Figure 3:
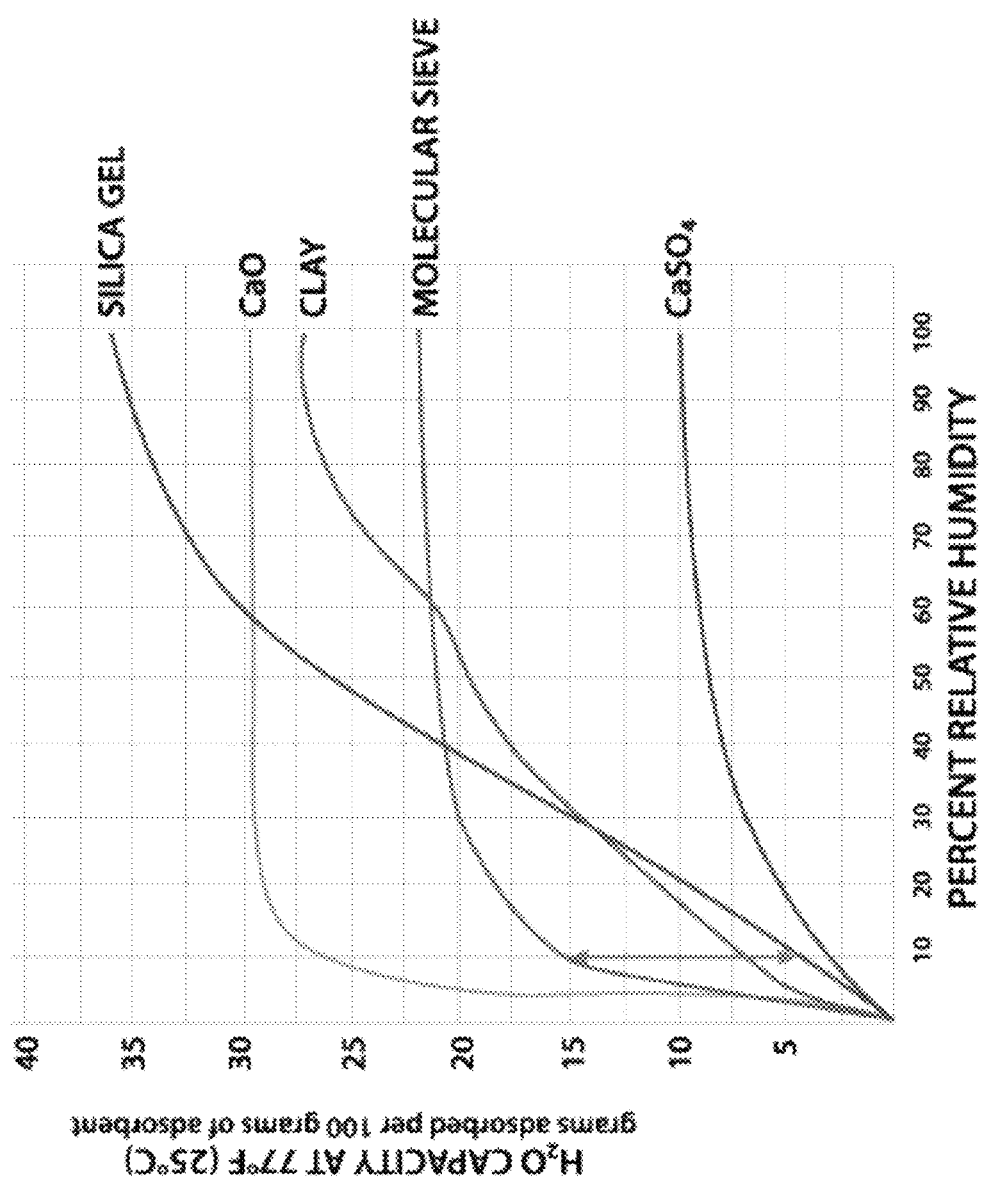
FIG. 3 is a plot of water adsorption isotherms for various desiccants including silica gel.

The asymmetry is provided by the desiccant layer 114b, which sequesters water away from only one side of the variable-permeability layer 114a (e.g., the side of the variable-permeability layer 114a closest to the desiccant layer 114b). FIG. 3 illustrates an plot of adsorption isotherms (adsorption as a function of relative humidity at constant temperature) for silica gel, a non-toxic nano-porous mineral, as well as CaO, clay, molecular sieves, and $CaSO_4$. Silica gel adsorbs water roughly in proportion with the relative humidity RH of the surrounding air, and has the capacity to hold up to about 37% of its dry weight in water. Water diffuses relatively slowly inside silica gel, which gives rise to a lag between a change in humidity on one side of the silica gel layer and when the moisture content begins to equilibrate on the other side. The lag time, which scales with the diffusion constant $D_{SG}=2\times10^{11}$ $m^2$ $s^{-1}$ and the desiccant layer thickness L as $L^2/2D_{SG}$, characterizes how long the silica gel sequesters water away from the vapor barrier and enables the structure to rectify vapor transport. As an example, 1 mm of silica gel gives a lag time of about 7 hours, which is long enough to rectify diurnal (daily) humidity variations. 2 cm of silica gel gives a lag time of over about 115 days, suggesting that it should be possible to rectify annual humidity cycles as well.

Relative humidity variations are caused most significantly by temperature changes. RH and temperature are inversely related because the capacity of air to hold water vapor increases with temperature. As an example, assume air with a fixed water content that starts at 23° C. and 40% relative humidity. As the air warms to 28° C., the relative humidity falls to 29.7%. As the air cools to 18° C., the relative humidity rises to 54.5%. These changes can be evaluated using a psychrometric chart or the Magnus formula. Over that same 10° C. temperature range, the permeance of a smart vapor barrier is expected to change by a factor of about 7 according to FIG. 2, and the silica gel to exchange about 13% of its dry mass in water according to FIG. 3. These are both large effects.

Figures 4A, 4B:
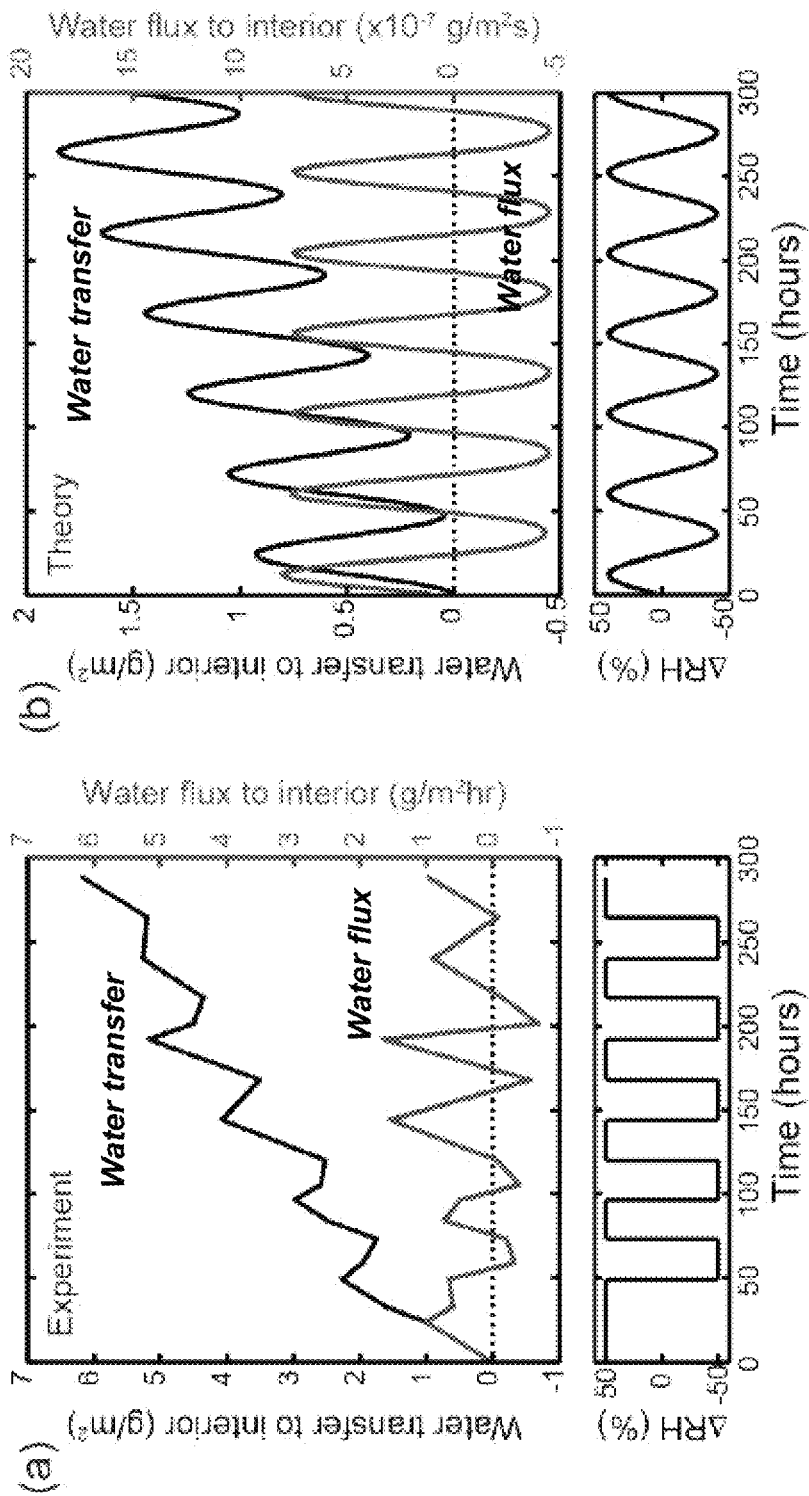
FIG. 4a is a plot illustrating measurement of water flux and net water transfer across the multifunctional material system of FIG. 1.
FIG. 4b is a plot illustrating theoretical simulations of water flux and net water transfer across the multifunctional material system of FIG. 1.

Measurements of water transport across a prototype multifunctional material system formed with MemBrain (Certainteed) as the variable-permeability layer and a desiccant layer formed from silica gel particles were performed. A porous and highly permeable plastic film was used to hold the silica gel particles (on the order of millimeters, e.g., about 1-10 mm against the MemBrain. This multifunctional material system was subjected to a humidity gradient by using it to cover a wide cup of water, which exposed one side to approximately 100% RH and the other side to the laboratory environment of about 50% RH. The RH gradient was periodically varied by flipping the structure daily, exposing the opposite side to the water vapor. The masses of the cup and the multifunctional material system were each measured at regular intervals to determine the transfer of water across the vapor barrier and into the silica gel. FIG. 4(a) plots the measured water flux and the net water transfer to the desiccant side as functions of time. The flux of water from the MemBrain side to the silica gel side was more than twice as large as the flux in the opposite direction over a full cycle. Water moved to the silica gel side at an average rate of about 0.5 g $m^{-2}$ $day^{-1}$. To place this result in context, for a modestly sized house with an enclosure area of 200 $m^2$, this pumping rate would remove approximately 0.1 L per day from the walls.

The water transport was also modeled theoretically using finite difference methods. Specifically, MATLAB was employed to model the diffusion of water across the prototype multifunctional material system. The simulations were performed assuming a 75 m thick polyamide layer as the variable-permeability layer and a 200 m thick silica gel layer as the desiccant layer. Relative humidity was varied sinusoidally on each side of the simulated multifunctional material system about a mean RH of 50%, with an amplitude of 20% and a period of 48 hours. The two sides were out of phase.

FIG. 4(b) plots the simulated water flux across the prototype multifunctional material system as well as the integrated mass of water accumulating on the desiccant layer side. The peak flux of water from the side of the variable-permeability layer (polyamide side) to the desiccant layer side is twice as large as the peak flux in the opposite direction over a full cycle. Water accumulates on the desiccant layer side at a rate of about 0.1 g m$^{-2}$ day$^{-1}$.

It can be appreciated that the pumping effect provided by the vapor diode functionality operates even when the humidity variations on either side are in phase. That is, even when there is no humidity gradient. The only requirement for pumping is that the humidity vary cyclically in time. As an example, when the humidity on both sides of the multifunctional material system 114 is high, water vapor diffuses into the desiccant layer 114b from both sides (e.g., via adjacent air and the variable-permeability layer 114a), with a high rate of transport through the variable-permeability layer 114a. The distribution of water within the desiccant layer 114b can equilibrate slowly (e.g., a time for full equilibration can be several hours when the desiccant layer 114b is about 1 mm thick). Subsequently, when the humidity is low on both sides of the multifunctional material system 114, water vapor diffuses out of the multifunctional material system 114 from both the side of the variable-permeability layer 114a and the side of the desiccant layer 114b. However, the rate of diffusion on the side of the variable-permeability layer 114a is significantly slower as compared to when the water vapor entered. This imbalance between the rates of water entering and exiting through the variable-permeability layer 114a results in net transfer (pumping) of water in the direction of the desiccant layer 114b.

Phase Change Functionality

A rise in temperature causes RH to decrease and water to evaporate from the desiccant layer 114b. Conversely, a fall in temperature causes RH to increase and desiccant layer 114b to absorb water. The latent heat absorbed and released in those two processes, respectively, regulates the temperature and reduces the demands on the HVAC system. The principle is the same as for phase change materials, except ambient water is the substance changing phase.

For every gram of water that evaporates, about 2500 J is absorbed from the environment. That accounts for the latent heat of vaporization plus a small surface binding energy. As an example, the latent heat density in silica gel can be as high as about 925 kJ/kg. However, only a fraction of this latent heat is accessible in practice. In general, the desiccant layer 114b does not dry out completely nor fill completely with water under normal operating conditions.

A more realistic estimate of the latent heat density can be based on the same 10° C. temperature change considered above, and the fact that the adsorption isotherm in FIG. 3 does not change significantly with temperature. The water adsorbed or released by the silica gel desiccant over that temperature rise is expected to total around 13% of its dry mass. This corresponds to a latent heat density of about 325 kJ/kg. For comparison, the latent heat density of commercial phase change materials ranges from 120 to 220 kJ/kg. It can be understood that it should be possible to engineer the desiccant material to evolve the same latent heat over a narrower temperature range. That is, the adsorption isotherm needs to be steeper in the relevant RH range.

At a cost of about $1/kg, silica gel is a relatively cheap desiccant material. It can supply latent heat at about 320 kJ/$. Commercial PCM cost much more, with cheap ones selling for around 36 kJ/$ (based on 120 kJ/kg and $1.5/lb.) Furthermore, with a density of about $\rho_{SG}$=1280 kg m$^{-3}$, a 1 mm silica gel layer would have an areal mass of about 1.28 kg m$^{-2}$ and would offer about 416 kJ m$^{-2}$ of latent heat. For comparison, commercial gypsum board with PCM (e.g. National Gypsum ThermalCORE) has 250 kJ m$^2$.

Humidity Buffer Functionality

A 1 mm-thick layer of silica gel desiccant has the capacity to hold up to about 450 g of water per square meter of wall. However, more realistically, this value is closer to about 150 g m$^{-2}$, representing the amount of water that would be exchanged between the walls and the interior environment under normal conditions. In a modestly sized house, the multifunctional material system 114 could adsorb or release about 30 L of water. That could significantly improve comfort, reduce the energy demands on the HVAC system, and even obviate the need for a powered humidifier or a powered de-humidifier.

Finally, it is worth noting that there is a common misconception that silica gel is a hazardous material. This comes from the words "DO NOT EAT" written on the familiar white silica gel packets found in packaging (e.g., shoe boxes). However, silica gel itself is non-toxic. Instead, the warning is provided because silica gel beads are often impregnated with cobalt(II) chloride, which is carcinogenic. The cobalt(II) chloride serves as a moisture indicator by changing color from blue to pink as the moisture content rises. Because there is no need to include cobalt(II) chloride in a construction material, use of silica gel desiccant raises no obvious safety concerns.

Functionality Control

The requirements and relative importance of the three functions of the multifunctional material system 114 can depend on where in the building envelope the multifunctional material system 114 is used and the climate in which the building is located. In one aspect, the ability of the multifunctional material system 114 to regulate humidity can be more desirable on the interior of a building than on the exterior. In another aspect, the vapor diode functionality can be more desirable in damp climates than in dry ones. Methods are available for adjusting manufacturing and material parameters to control performance characteristics of the multifunctional material system 114. This can allow the performance of different building materials incorporating the multifunctional material system 114 to be optimized for specific applications.

The timescale over which the multifunctional material system 114 rectifies humidity fluctuations is set by the timescale for water to diffuse through the desiccant layer 114b and reach a steady-state concentration. For a continuous desiccant layer 114b of thickness L, that timescale t is given by $$t \approx \frac{L^2}{D_{SG}}.$$

It is also possible for the desiccant layer 114b to be in the form of a composite including a plurality of desiccant particles held in proximity to one another within a matrix. In this configuration, if the diffusivity of water within the matrix is significantly higher than in the desiccant particles, the longest timescale over which rectification can be observed will scale as $$\frac{r^2}{D_{SG}},$$

where r is the radius of the desiccant particles. When the desiccant layer 114b is composed of desiccant particles with a distribution of sizes, the time response of the desiccant layer 114b will reveal a distribution of relaxation times. If the diffusivity of water within the matrix is significantly lower than in the desiccant particles, the timescale could be much longer and described by a percolation model.

The capacity of the multifunctional material system 114 to regulate temperature, the latent heat, is proportional to the quantity of water that is exchanged between the condensed and vapor phases. Given enough time to equilibrate, the latent heat that can be stored in or released from a continuous desiccant layer 114b is proportional to the thickness. However, given only a finite amount of time t, the part of the desiccant layer 114b whose water concentration significantly changes has a finite thickness $\Delta_x \approx \sqrt{2D_{SG}t}$. The diurnal cycle sets a relevant timescale for energy efficiency applications and consequently a maximum useful thickness of a continuous desiccant layer 114b.

The useful quantity of latent heat available in the multifunctional material system 114 can be increased by providing the desiccant layer 114b in composite form, as discussed above, with the matrix possessing a high water vapor diffusivity. The desiccant particles should be small enough that their moisture content can equilibrate within about 12 hours or less. The latent heat content available from such a desiccant layer 114b increases with thickness to values exceeding $\Delta_x \approx \sqrt{2D_{SG}t}$ because water vapor is able to diffuse more quickly through the matrix. The maximum useful thickness will scale as $\Delta_x \approx \sqrt{2D_M t}$, where $D_M$ is the effective diffusivity of water vapor in the matrix. Phase-change materials are effective at reducing the heating and cooling demands of a building's HVAC system when they are incorporated toward the exterior of the building envelope, at a location where the temperature would otherwise swing back and forth through the interior set point.

The capacity of the multifunctional material system 114 to regulate humidity is also related to the quantity of water that can be exchanged between condensed and vapor phases. The same strategies described above can be used to adjust that capacity.

The permeance of the variable-permeability layer 114a is inversely proportional its thickness. Therefore, the RH-dependent permeance curve can be scaled by a desired factor by manufacturing the variable-permeability layer 114a with the correct thickness. Control over the overall permeance is important because it influences how effectively the multifunctional material system 114 can harness humidity fluctuations to pump water vapor. It is also important because wall assemblies must be allowed to have a high drying potential, and hence a high permeability, in at least one direction. For example, in cold climates, wall assemblies are often designed to dry to the outside, and the building wrap used as an air and weather barrier to the exterior of the sheathing is highly permeable to water vapor. Replacing the building wrap with the multifunctional material system 114 can improve the performance of the envelope without sacrificing drying potential if the variable-permeability layer 114a is made to have a high enough permeance under humid conditions. That is, relatively low permeance is not problematic when the wall cavity 104 is dry.

The microstructure and properties of the desiccant material can be engineered in order to control the performance of the multifunctional material system 114. As an example, the size distribution of pores and the hydrophilicity of the surfaces of the desiccant material affect the shape of the adsorption isotherm. Nanoporous materials with relatively hydrophobic surfaces adsorb little to no water until a critical humidity value of the air is exceeded. At this point, it becomes energetically favorable for liquid water to condense inside the narrowest constrictions of the pores. The onset of this effect occurs at higher humidity values in larger pores because it is controlled by capillarity. As another example, different desiccant materials preferentially adsorb water vapor in a range of RH indicated by the steepness of the slope of their adsorption isotherms (FIG. 3). A particular material can be selected because it buffers RH effectively in a particular range of interest, or multiple desiccant materials can be combined to tailor the range over which the mixture effectively buffers RH. Therefore, materials and microstructures (e.g., pore size) can be selected to buffer the relative humidity most effectively within a selected range of RH values (e.g., the slope of the adsorption isotherm is maximal within the selected RH range).

Exemplary Multifunctional Material Architectures

Embodiments of the architecture of the multifunctional material system 114 discussed above can be realized as a self-supporting membrane. FIG. 5a illustrates a multifunctional material system 500 including the variable permeability layer 114a adhered to a desiccant layer. As shown, the desiccant layer 114b can be substantially homogeneous.

Figure 5B:
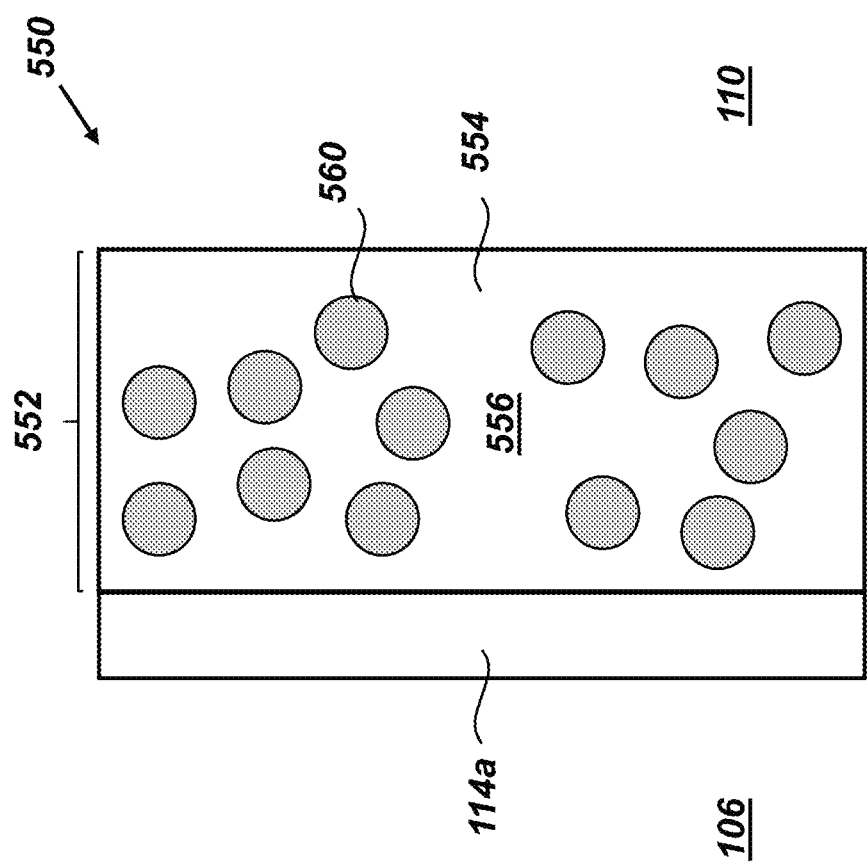
FIG. 5b is a diagram illustrating one exemplary embodiment of a multifunctional material system including a desiccant layer in the form of a composite.

FIG. 5b illustrates another embodiment of the multifunctional material system 500 in the form of multifunctional material system 550. As shown, the multifunctional material system 550 includes the variable-permeability layer 114a and the desiccant layer 114b in the form of a composite desiccant layer 554 including a first component and a second component. As an example, the first component can be a matrix 556 and the second component can be a desiccant material 560 embedded within the matrix 556. The geometry of the desiccant material 560 can be varied. In one aspect, the desiccant material 560 can take the form of plurality of desiccant particles embedded within the matrix 556. In certain embodiments, the desiccant particles can be approximately uniform in size (e.g., diameter) and shape. In other embodiments, the desiccant particles can have a distribution of sizes (e.g., an approximately normal distribution, a binary distribution, etc.). As an example, the desiccant particle sizes can range from about 0.05 mm to about 5 mm.

The matrix 556 of the composite desiccant layer 552 can be formed from a material with a high permeability to water vapor. In an embodiment, materials having a permeability greater than 5 US perms (e.g., greater than 10 perms) can be considered to be vapor-permeable materials. Examples of the matrix 556 can include binding agents, foams (e.g., for insulation), meshes, fiber mats, filaments, textiles, fabrics, drywall, sheathing, cladding, structural insulating panels (SIP). Examples of the binder material can include polylactic acid (PLA), polytetrafluoroethylene (e.g., colloidal polytetrafluoroethylene), a polyurethane (thermoplastic or foams), a silicone, a natural rubber, a synthetic rubber, polymethylpentene (PMP), a polystyrene (PS), a polycarbonate (PC), polyvinyl alcohol (PVA), or polymethylmethacrylate (PMMA). Other polymers and resins are also contemplated.

The desiccant material 560 within the matrix 556 can be formed from any of the desiccant materials discussed above in the context of the desiccant layer 114b. Examples of the desiccant material can include one or more of silica gel, zeolites, calcium oxide ($CaO_2$), calcium sulfate ($CaSO_4$), lithium chloride (LiCl), clays, or activated charcoal. Combinations of two or more different desiccant materials are also contemplated.

In further embodiments, the multifunctional material system 114 can be modified to include one or more vapor-permeable layers (e.g., layers that are highly permeable to water vapor). In certain aspects, these vapor-permeable layers can provide mechanical support to the multifunctional material system 114 without fundamentally changing its functionality. In other aspects, vapor-permeable materials forming the vapor-permeable layer can be materials having a permeability greater than 10 US perms, while vapor-impermeable materials can be materials having a permeability less than 0.1 US perms. Examples of materials forming the vapor-permeable layers can include a fabric, a mesh, a fiber mat, a porous material, a silicone, a natural rubber, a synthetic rubber, a polystyrene (e.g., high impact polystyrene [HIPS]), a polymethylpentene (PMP), a polycarbonate (PC), a polyurethane (PU), or a polymethylmethacrylate (PMMA).

FIG. 6 illustrates an embodiment of the multifunctional material system 114 in the form of multifunctional material system 600. The multifunctional material system 600 is similar to multifunctional material system 500, with the addition of a vapor-permeable layer 602 for support. As shown in FIG. 6, the vapor-permeable layer 602 is positioned on both sides of the desiccant layer 114b, with the variable-permeability layer 114a positioned on the side of one of the vapor-permeable layers 602 closest to the interior environment 106. However, in alternative embodiments, one or more vapor-permeable layer can be employed, on either side of the desiccant layer. In further embodiments, the positions of the vapor-permeable layer and the variable-permeability layer can be switched. That is, the vapor-permeable layer(s) can be positioned in contact with the variable-permeability layer, the desiccant layer, or both. In other embodiments, the vapor-permeable layers can be configured to provide functionality, such as water repellency. It can be further understood that, while not shown, any embodiment of the multifunctional material system disclosed herein can include one or more of the vapor-permeable layers, as necessary.

Embodiments of the vapor-permeable layers 602 can adopt a variety of configurations. In one aspect, the mechanical properties of the vapor-permeable layers 602 can be tailored within specific ranges. Examples of mechanical properties can include rigidity (e.g., having an elastic modulus greater than a predetermined value), flexibility (e.g., having an elastic modulus less than a predetermined value or yield stress less than a predetermined value), impact resistance (e.g., hardness greater than a predetermined value), acoustic absorption (e.g., acoustic attenuation greater than a predetermined value), resistance to tearing (e.g., fracture toughness greater than a predetermined value, strength (e.g., tensile strength greater than a predetermined value) or peeling resistance (e.g., having a peel strength greater than a predetermined value).

In further embodiments, the desiccant layer 114b can include two or more layers. FIG. 7a illustrates and embodiment of the multifunctional material system 114 in the form of multifunctional material system 700. As shown, the desiccant layer 114b includes a first desiccant layer 702 and a second desiccant layer 704. The first and second desiccant layers 702, 704 can be composites, as discussed above, including a matrix and a desiccant material (e.g., desiccant material 560) embedded therein. In certain embodiments, the matrix can function as a binder for retention of the embedded desiccant material. As an example, the first desiccant layer 702 can include a matrix formed from a material as discussed above with regards to the variable-permeability layer 114a. The second desiccant layer can include a matrix formed from the same material as discussed above with regards to the vapor-permeable layer 602. Thus, the matrix of the first desiccant layer 702 can perform the functions of the variable-permeability layer 114a, as discussed above.

In an alternative embodiment, the functionality of the desiccant layer 114b and the variable-permeability layer 114a can be provided by a single layer of the multifunctional material system 114. FIG. 7b illustrates the multifunctional material system 114 in the form of multifunctional material system 750 that includes a composite desiccant layer 752 including a matrix formed from a material as discussed above with regards to the variable-permeability layer 114a and the desiccant material 560 embedded therein. The concentration (e.g., volume fraction) of the desiccant material 560 can vary through the thickness. As an example the concentration of the desiccant material 560 in a first portion 754 of the multifunctional material system 750 can be a relatively low value and a concentration of the desiccant material 506 in a second portion 756 of the multifunctional material system 750 can be a relatively high value. In certain embodiments, the concentration of the desiccant material 560 within the high concentration portion 756 can be approximately 3 times greater than the concentration of the desiccant material 560 within the low concentration portion 754. So configured, the low concentration portion 754 of the multifunctional material system 750 can effectively function as the variable-permeability layer 114a and the high concentration portion 756 of the multifunctional material system 750 can effectively function as the desiccant layer 114b. The thickness of the low concentration portion 754 can be in the range from about 0.001 mm to about 0.1 mm and the thickness of the high concentration portion 756 can be in the range from about 0.05 mm to about 20 mm. As further illustrated in FIG. 7, the multifunctional material system can optionally include the vapor-permeable layer 602 adhered to one or both sides of the composite desiccant layer 752.

In certain embodiments, the multifunctional material system 114 can be incorporated into buildings in the form of a separate membrane, such as a vapor barrier or building wrap. In other embodiments, it can be desirable to add multifunctionality to the building envelope without increasing the complexity of the building envelope. Thus, the multifunctional material system can also be integrated with one or more other elements of the building envelope, such as the cladding, sheathing, roofing, insulation, and/or interior paneling.

As an example, the multifunctional material system 114 can be employed to form a functionalized building material. As shown in FIG. 8, a multifunctional material assembly 800 is formed by securing any embodiment of the multifunctional material system 114 discussed herein to a substrate 802.

In certain embodiments, multifunctional material system 114 can be secured to the substrate 802 by a vapor-permeable adhesive 804. The vapor-permeable adhesive 804 can have a permeability selected from the range of 5 to 100 perms. Examples of the vapor-permeable adhesive include polyvinyl alcohol and rubber cement. Examples of the substrate can be vapor-permeable and can include oriented strand board (OSB), insulation (e.g., rigid foam insulation), gypsum board, cement board, stucco, drywall, sheathing, roofing, cladding, or an architectural membrane, or another building material. So configured, when the substrate 802 and the adhesive 804 are permeable to water vapor, all three of the functions of the multifunctional material system 114 can operate.

In configurations where at least one of the substrate or the adhesive is relatively impermeable to water vapor and functions as a vapor barrier (e.g., having a permeability less than 0.01 perms), the multifunctional material system can cease to function as a vapor diode. However, the temperature and humidity regulating capabilities can be retained.

In alternative embodiments, the adhesive can be omitted, and other mechanisms can be employed to secure the substrate to the multifunctional material system. In one aspect, nails, screws, or other fastening mechanisms can be employed. In another aspect, an interface can be present between the substrate and the multifunctional material system (e.g., the variable-permeability layer). Within the interface, the variable-permeability layer can extend within the substrate and mechanically interlock thereto, the substrate can extend within the variable-permeability layer and mechanically interlock thereto, or combinations thereof.

In further alternative embodiments, the functionality of the adhesive 804 and the variable-permeability layer 114a can be combined into a single layer. FIG. 9 illustrates an embodiment of the multifunctional material assembly 800 in the form of multifunctional material assembly 900 including the substrate 802, desiccant layer 114b, and a variable-permeability adhesive layer 902. The variable-permeability adhesive layer 902 is interposed between the substrate 802 and the desiccant layer 114b and is configured to attach the desiccant layer 114b to the substrate 802. The variable-permeability adhesive is further configured to provide the functionality of the variable-permeability layer, as discussed above. Examples of the variable-permeability adhesive can include polyvinyl alcohol (PVA) and rubber cement. By combining multiple functionalities (adhesion and variable-permeability) into the variable-permeability adhesive layer 902, the number of layers needed to achieve all three functions of the multifunctional material system 114 within the multifunctional material assembly 900 can be reduced. This simplification of can reduce the cost of manufacture of the multifunctional material assembly 900.

In further embodiments of the multifunctional material assembly 800, the variable-permeability layer 114a and desiccant layers 114b can be separated from one another by one or more intervening layers. FIG. 10 illustrates an embodiment of the multifunctional material assembly 800 in the form of multifunctional material assembly 1000. As shown, the substrate 802 is interposed between the variable-permeability layer 114a and the desiccant layer 114b. Thus, the variable-permeability layer 114a and the desiccant layer 114b are located on opposite sides of the substrate 802. So configured, the functionality of the multifunctional material system 114 can be preserved, provided that the substrate 802 is permeable to water vapor. Optionally, one or more vapor-permeable layers 602 can be interposed between the variable-permeability layer 114a and the desiccant layer 114b.

Figure 11:
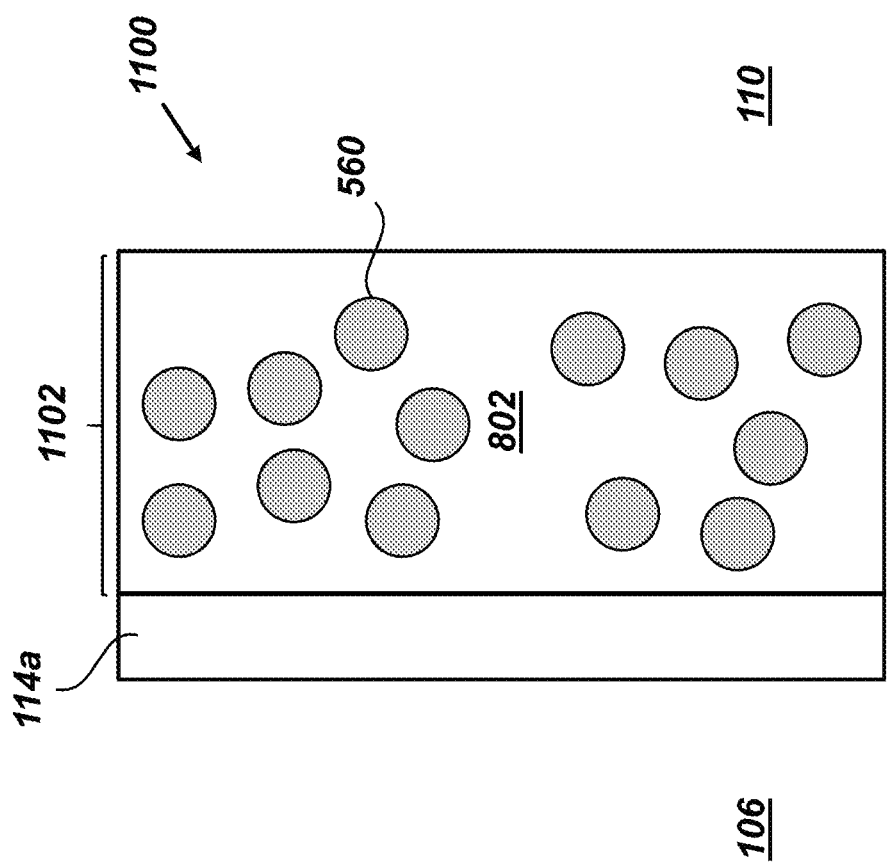
FIG. 11 is a diagram illustrating another exemplary embodiment of a multifunctional material adhered to one surface of a substrate, with a desiccant layer of the multifunctional material system including desiccant particles embedded in a matrix formed from a substrate material.

FIG. 11 illustrates an embodiment of the multifunctional material assembly 800 in the form of multifunctional material assembly 1100 including a composite desiccant layer 1102 in which the desiccant material 560 is embedded in a matrix formed from the material of the substrate 802. The variable-permeability layer 114a is further attached to one side of the composite desiccant layer 1102. As discussed above, the substrate can be formed from a material including oriented strand board (OSB), insulation (e.g., rigid foam insulation), gypsum board, cement board, stucco, drywall, sheathing, roofing, cladding, or an architectural membrane. By combining the functionality of the desiccant material 560 with additional functionalities of the substrate 802, the number of layers required to achieve all three functions of the multifunctional material system 114 and the functionalities of the substrate 802 can be reduced. This simplification of can reduce the cost of manufacture of the multifunctional material assembly 1100.

Figure 12:
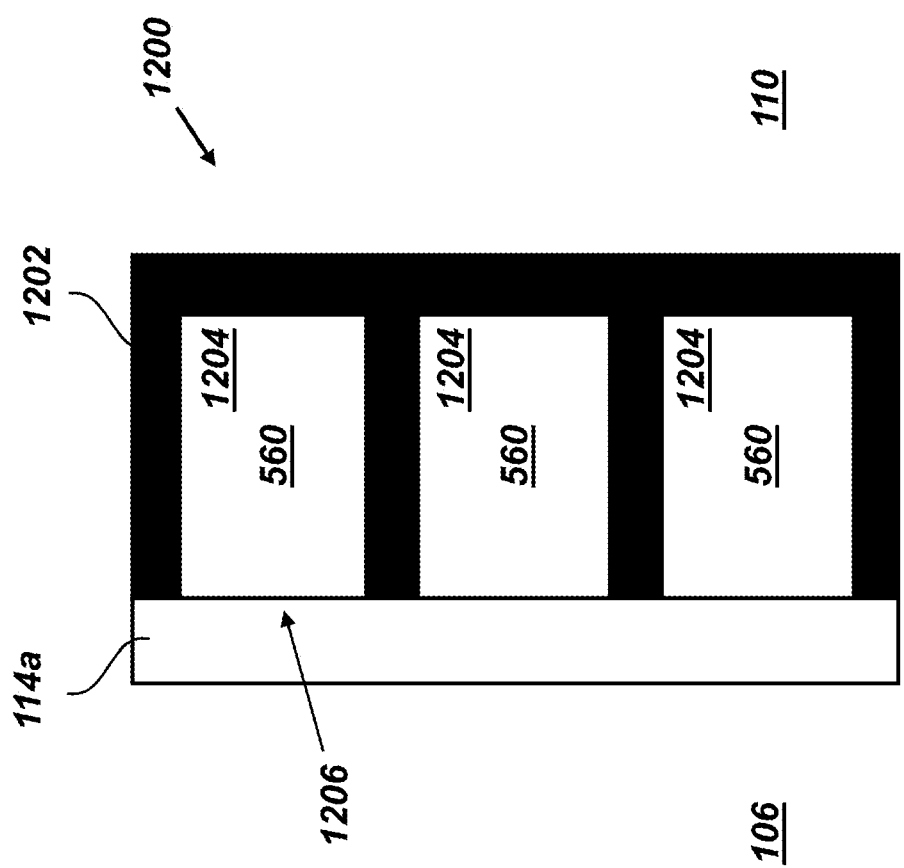
FIG. 12 is a diagram illustrating another exemplary embodiment of a multifunctional material including a desiccant layer in the form of a pocketed structure with pockets containing desiccant particles.

Embodiments of the multifunctional material system 114 can adopt further architectures. FIG. 12 illustrates an embodiment of the multifunctional material system 114 in the form of pocketed multifunctional material system 1200. The pocketed multifunctional material system 1200 includes a pocketed frame 1202 that defines one or more pockets 1204. The desiccant material 560 (e.g., desiccant particles) can occupy at least a portion of the volume of the pockets 1204. As further shown in FIG. 12, the pocketed frame 1202 defines one or more pockets 1204 that contain an opening 1206 one end. The variable-permeability layer 114a can be positioned such that it extends across the opening(s) 1206 of the pocket(s) 1204.

In certain embodiments, the pockets 1204 contain only the desiccant material 560. That is to say, no binder or adhesive is present. Thus, the walls of the pockets 1204 (e.g., the pocketed frame 1202 and the variable-permeability layer 114a) are solely responsible for retaining the desiccant material 560 within the pockets 1204.

The pocketed frame 1202 can be formed from a material that is permeable to water vapor. As an example, the pocketed frame 1202 can be formed from the same material as discussed above with respect to the vapor-permeable layer 602 (e.g., one or more of polylactic acid (PLA), a natural rubber, a synthetic rubbers, a polymethylpentene (PMP), a polystyrene (PS), a polycarbonate (PC), a polydimethylsiloxane (PDMS), or wood). In alternative embodiments, the permeability of the pocketed structure can be achieved by forming the pocketed structure with a material that includes a plurality of pores. As an example, the pocketed structure can be formed from a mesh having openings that are smaller than the diameter of the desiccant particles. Additional examples of materials that can form the pocketed structure include one or more of fabrics, fibrous mats, open cell foams, or perforated plastics.

Figure 13:
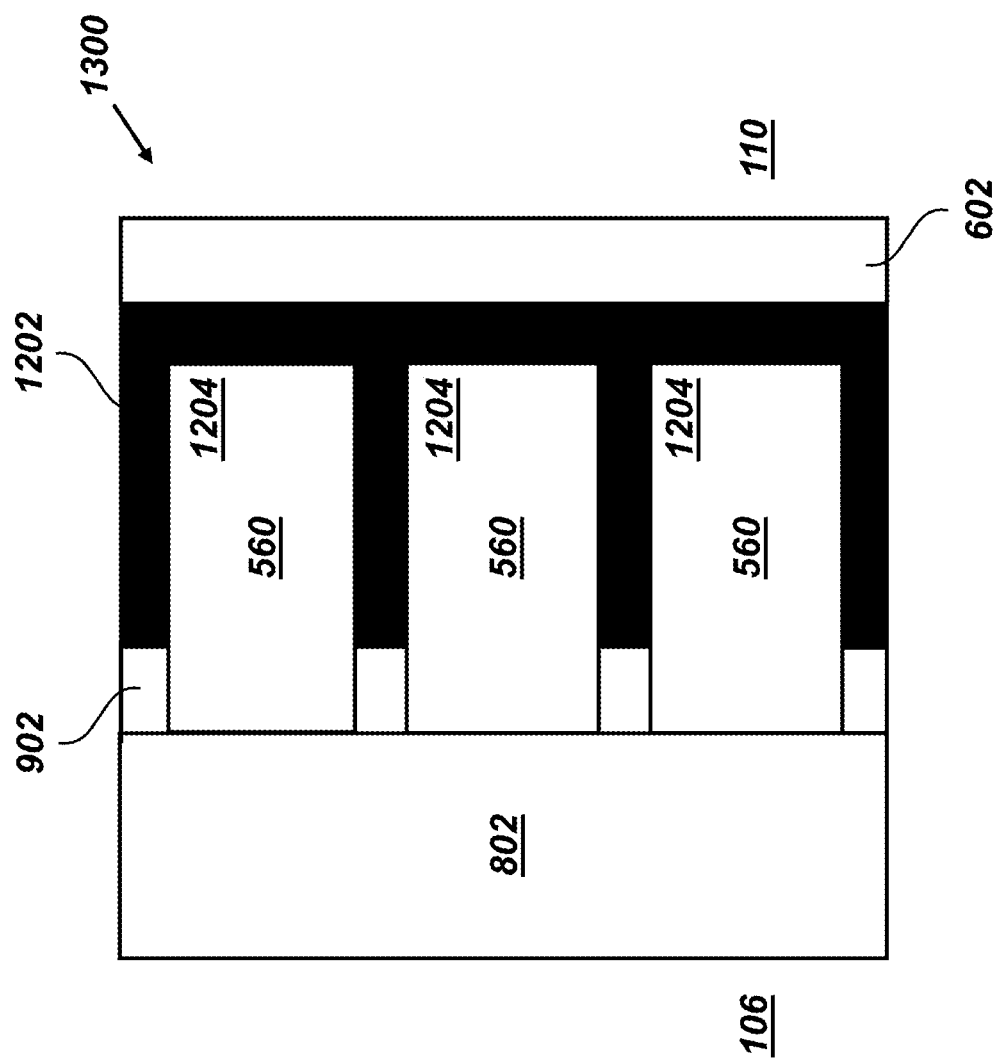
FIG. 13 is a diagram illustrating the multifunctional material of FIG. 12 adhered to a substrate.

FIG. 13 illustrates the multifunctional material system 1200 of FIG. 12 secured to the substrate 802 to form multifunctional material assembly 1300. As shown, the variable-permeability adhesive layer 902 is interposed between the substrate 802 and the pocketed frame 1202. However, in alternative embodiments, other securing mechanisms can be employed. Optionally, one or more vapor permeable layers can be provided (e.g., opposite the substrate, for support of the pocketed structure.

Buildings typically include a building envelope that separates conditioned and unconditioned spaces. The building envelope can provide resistance to transmission of air, water, heat, lights, and/or noise thereacross. It can be desirable for the building envelope to be approximately continuous in order to provide the desired resistance to transmission therethrough. That is, any gaps present in the building envelope have an insignificant effect on the desired resistance to transmission therethrough.

As discussed above, embodiments of multifunctional material assemblies 800 discussed herein can be employed as building envelopes. Under circumstances where the substrate 802 is a relatively flexible material, the multifunctional material assembly 800 can be wound about frame of a building. Provided that such flexible multifunctional assemblies are wound in an a substantially overlapping manner, gaps can be avoided.

Under circumstances where the substrate 802 is a relatively rigid material, embodiments of the multifunctional material assembly 800 can be formed as panels. The panels can be secured to the frame of a building to provide the building envelope. However, it can be appreciated that gaps or seams can be present between adjacent panels of the multifunctional material assembly 800. These gaps, if not addressed, they can allow water vapor to bypass the multifunctional material system 114.

Figure 14:
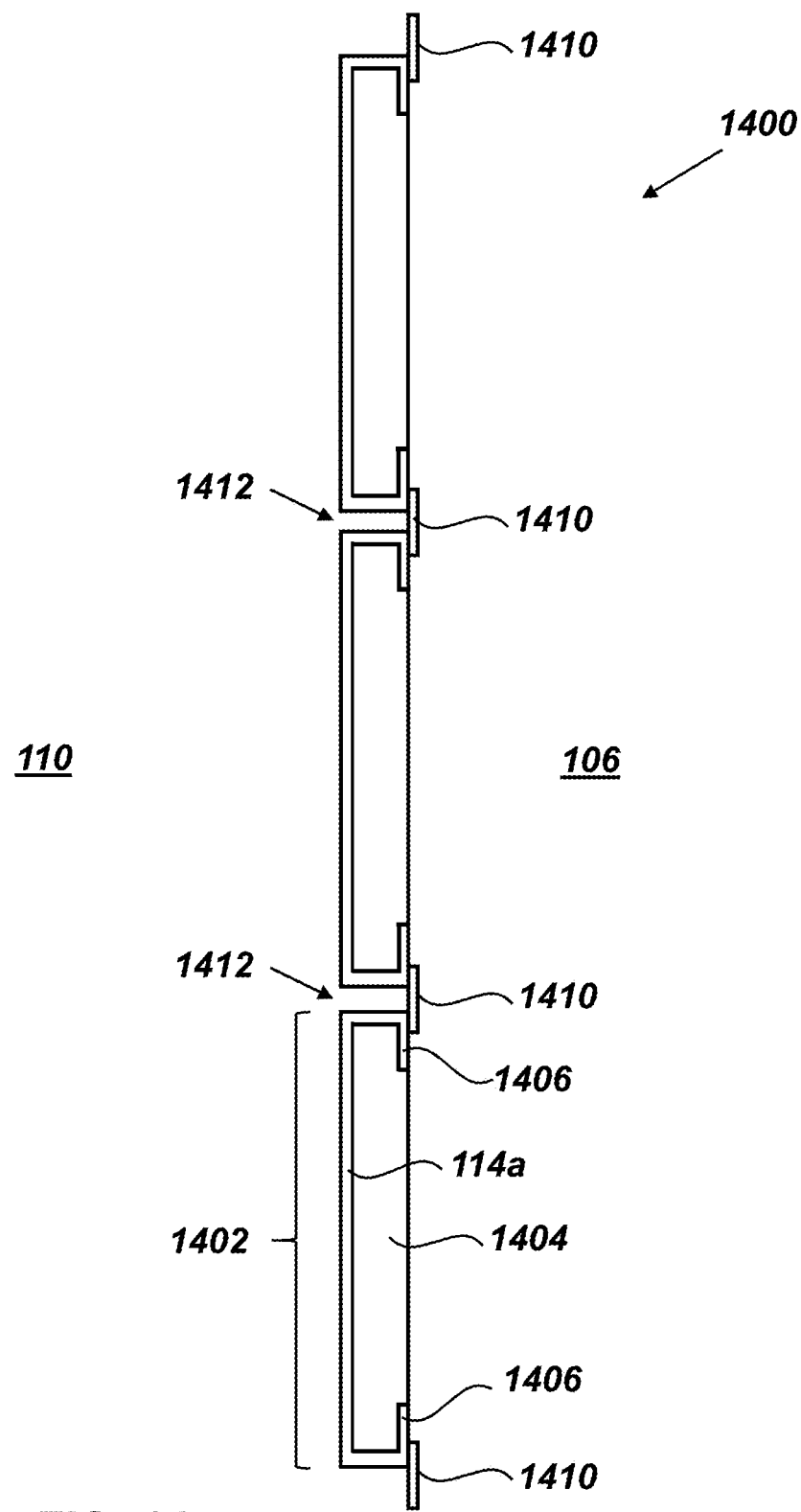
FIG. 14 is a diagram illustrating another exemplary embodiment of smart wall panels including the multifunctional material system with a variable-permeability layer wrapped around edges of the panel and vapor-tight seals formed between adjacent smart wall panels.

To address the potential issue of gaps between panels of the multifunctional material assembly 800 can be employed as a building envelope. FIG. 14 shows a portion of a building envelope 1400 including a plurality of multifunctional material assemblies 800 in the form of multifunctional material panels 1402. As illustrated, the multifunctional material panels 1402 include a core 1404 and the variable-permeability layer 114a extending around three-sides of the core 1404 and extending along a portion of the fourth side to form a lip 1406. The side of the core 1404 that is not completely covered by the variable-permeability layer 114a can face an conditioned environment (e.g., exterior environment 110), while the opposing side of the core 1404 covered by the variable-permeability layer 114a can face a conditioned environment (e.g., interior environment 106). The core 1404 can include the substrate 802 and the desiccant layer 114b. In one embodiment, the substrate 802 and the desiccant layer 114b can be separate layers. In alternative embodiments, the core can be in the form of the composite desiccant layer 1102, where the desiccant material 560 is embedded within the a matrix of the substrate 802.

A substantially vapor-tight seal 1410 can be formed along gaps 1412 between adjacent multifunctional material panels 1402 by application of a sealing material. The sealing material can be any material that substantially inhibits transmission of water vapor therethrough.

For multifunctional material panels 1402 that are cut to size, a new lip can be provided along the cut edge with the variable-permeability layer 114a. Furthermore, damaged multifunctional material panels 1402 can be patched with other pieces of the multifunctional material panel 1402 after its edges and the edges of the gaps 1412 are sealed.

The sealing material can adopt a variety of configurations. In one aspect, the sealing material can be an adhesive vapor barrier tape that is substantially impermeable to water vapor. The lip is present to ensure that the adhesive vapor barrier tape seals to the variable permeability layer 114a. As an alternative or in addition to the adhesive vapor barrier tape, a vapor-impermeable liquid sealant can be employed to form the seals 1410. In such embodiments, the lip can be omitted.

Methods for fabricating multifunctional material assemblies for use as building materials are further provided. In one operation, the substrate 802 is provided. As discussed above, embodiments of the substrate can include oriented strand board (OSB), insulation (e.g., rigid foam insulation), gypsum board, cement board, stucco, drywall, sheathing, roofing, cladding, or an architectural membrane, or other building materials.

Layers of the multifunctional material system can be deposited (e.g., by spreading or spray coating) on the substrate or incorporated within the substrate to form the multifunctional material assembly. In embodiments where the multifunctional material system includes a plurality of layers, the layers can be deposited sequentially. In certain embodiments, the multifunctional material assembly can be prepared remotely and secured to a building frame. In other embodiments, the substrate can be mounted to the building frame and the multifunctional material system can be subsequently deposited on the substrate.

Embodiments of the vapor-permeable layer and the variable-permeability layer can be deposited from an aqueous solution. As the deposited, aqueous solution of the layer dries, it can adhere to the underlying layer (e.g., the substrate, the other of the variable-permeability layer or vapor-permeable layer, the desiccant layer, etc.), providing a substantially continuous film of the vapor-permeable layer or variable-permeability layer.

Embodiments of the desiccant layer can be deposited in a variety of ways. In one aspect, the desiccant layer can be deposited from an slurry containing a binder and the desiccant particles. The desiccant particles can be one or more of silica gel, zeolites, calcium oxide ($CaO_2$), calcium sulfate ($CaSO_4$), lithium chloride (LiCl), clays, and activated charcoal. Examples of the binder can include polylactic acid (PLA), polytetrafluoroethylene (e.g., colloidal polytetrafluoroethylene), a polyurethane (thermoplastic or foams), a silicone, a natural rubber, a synthetic rubber, polymethylpentene (PMP), a polystyrene, a polycarbonate (PC), polyvinyl alcohol (PVA), or polymethylmethacrylate (PMMA). Other polymers and resins are also contemplated.

In embodiments of composite desiccant layers, where the matrix is a foam (e.g., a polyurethane foam), the foam can be formed from reaction of two or more components that evolve a gas. The foam matrix can be heated to dry or be self-heated by reaction of the two or more components. As the deposited, composite desiccant layer dries, it can adhere to the substrate, providing a substantially continuous film of the composite desiccant layer.

Alternative embodiments of composite desiccant layers can be extruded continuously. In one aspect, the desiccant layer can be extruded from a mixture of a thermoplastic polymer and desiccant particles. The desiccant particles can be one or more of silica gel, zeolites, calcium oxide ($CaO_2$), calcium sulfate ($CaSO_4$), lithium chloride (LiCl), clays, and activated charcoal. Examples of the thermoplastic can include natural rubbers, synthetic rubbers, polylactic acid (PLA), polystyrenes (e.g., high impact polystyrene [HIPS]), polymethylpentene (PMP), polycarbonates (PC), polyurethanes (PU), polymethylmethacrylate (PMMA), or polyvinyl alcohol (PVA).

Exemplary technical effects of the methods, systems, and devices described herein include, by way of non-limiting example a reduction of the average humidity inside a wall cavity due to the water vapor pumping effect and a resulting reduction in the risk of one or more of mold, rot, mildew, and dust mites. Further exemplary technical effects include a stabilization of the relative humidity inside an enclosure and associated improvements in comfort and air quality. Additional technical effects include a stabilization of the interior temperature and a reduction of the energy intensity of heating and cooling when a multifunctional membrane is located to the interior of an enclosure. Other technical effects include a further reduction in the energy intensity for heating and cooling when the multifunctional material system is located to the exterior such that it evaporatively cools exterior surfaces during the day using water that it gathers from the environment at night. Further technical effects include a dampening of humidity swings inside a wall cavity resulting in a reduced risk of water condensation inside the wall.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A multifunctional material system having a first side and a second side that opposes the first side, the system comprising:
    a variable-permeability layer configured to be applied to a first surface of a substrate; and
    a desiccant layer applied to a surface of the variable-permeability layer that is opposite to another surface of the variable-permeability layer adjacent the substrate;
    wherein water enters the desiccant layer through the variable-permeability layer when humidity is high on both the first and second sides of the multifunctional material system, wherein water leaves the desiccant layer through the variable-permeability layer when the humidity is low on both the first and second sides of the multifunctional material system, and wherein, when the humidity is high, a rate of water entering the desiccant layer through the variable-permeability layer is greater than a rate of water exiting the desiccant layer through the variable-permeability layer when the humidity is low.

2. The system of claim 1, further comprising a vapor-permeable layer, wherein the vapor-permeable layer is interposed between the desiccant layer and the variable-permeability layer.

3. The system of claim 1, wherein the desiccant layer is substantially homogeneous.

4. The system of claim 1, wherein the desiccant layer is a composite including desiccant particles embedded in a matrix.

5. The system of claim 1, wherein at least a portion of the desiccant layer is formed from desiccant material, and wherein the desiccant material is at least one of a silica gel, zeolites, calcium oxide ($CaO_2$), calcium sulfate ($CaSO_4$), lithium chloride (LiCl), a clay, or activated charcoal.

6. The system of claim 1, wherein the variable-permeability layer is formed from a polyamide or polyvinyl alcohol (PVA).

7. The system of claim 6, wherein the polyamide is nylon.

8. A multifunctional material assembly, comprising:
    a substrate;
    a first layer deposited onto the substrate, the first layer comprising a polyamide or polyvinyl alcohol (PVA); and
    a desiccant layer deposited onto the first layer, the desiccant layer comprising desiccant particles embedded into a matrix, wherein the matrix is a binder material formed of one or more vapor-permeable materials;
    wherein water enters the desiccant layer through the first layer when humidity is high on both the first and second sides of the multifunctional material system, wherein water leaves the desiccant layer through the first layer when the humidity is low on both the first and second sides of the multifunctional material system, and wherein, when the humidity is high, a rate of water entering the desiccant layer through the first layer is greater than a rate of water exiting the desiccant layer through the first layer when the humidity is low;
    wherein the first layer and the desiccant layer are separate and distinct from each other.

9. The assembly of claim 8, wherein the substrate is one of oriented strand board (OSB), insulation, gypsum board, cement board, stucco, drywall, sheathing, roofing, cladding, or an architectural membrane.

10. The assembly of claim 8, wherein the desiccant particles comprise one or more of silica gel, zeolites, calcium oxide ($CaO_2$), calcium sulfate ($CaSO_4$), lithium chloride (LiCl), clays, or activated charcoal.

* * * * *